US012494824B1

(12) United States Patent
Regev et al.

(10) Patent No.: US 12,494,824 B1
(45) Date of Patent: Dec. 9, 2025

(54) TECHNIQUES FOR JOINT DEMODULATION VIA PROXIMITY SERVICES

(71) Applicant: QUALCOMM Incorporated, San Diego, CA (US)

(72) Inventors: Aviv Regev, Tel Aviv (IL); Shay Landis, Hod Hasharon (IL); Ronen Shaked, Kfar Saba (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/786,908

(22) Filed: Jul. 29, 2024

(51) Int. Cl.
*H04B 7/0413* (2017.01)
*H04W 92/18* (2009.01)

(52) U.S. Cl.
CPC .......... *H04B 7/0413* (2013.01); *H04W 92/18* (2013.01)

(58) Field of Classification Search
CPC .......................... H04B 7/0413; H04W 92/18
See application file for complete search history.

(56) References Cited

U.S. PATENT DOCUMENTS

2016/0217519 A1* 7/2016 Kozat .................... H04W 4/06

* cited by examiner

*Primary Examiner* — Rahel Guarino
(74) *Attorney, Agent, or Firm* — Dalei Dong; Holland & Hart LLP

(57) ABSTRACT

Methods, systems, and devices for wireless communications are described. A first user equipment (UE) may transmit, in accordance with proximity-based service (ProSe) discovery with a network entity, a first capability message indicative of a first capability of the first UE to perform ProSe communications. The first UE may transmit a second capability message indicative of a second capability of the first UE to perform joint processing for multiple-input multiple-output (MIMO) communications, where the joint processing includes assistance by one or more assisting UEs for reception of a message at an assisted UE. The first UE may receive, based on transmission of the first capability message and the second capability message, an indication that the first UE is to perform the joint processing with a second UE. The first UE may perform the joint processing with the second UE in accordance with the indication.

20 Claims, 15 Drawing Sheets

TECHNIQUES FOR JOINT DEMODULATION VIA PROXIMITY SERVICES

FIELD OF DISCLOSURE

The present disclosure, for example, relates to wireless communications, including techniques for joint demodulation via proximity services (ProSe).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Some wireless communications systems may support Proximity or Proximity-Based Services (ProSe). For example, a UE may perform joint processing with another UE as a part of ProSe communications or after ProSe discovery.

SUMMARY

The systems, methods, and devices of this disclosure each have several innovative aspects, no single one of which is solely responsible for the desirable attributes disclosed herein.

A method for wireless communications by a first user equipment (UE) is described. The method may include transmitting, in accordance with proximity-based service (ProSe) discovery with a network entity, a first capability message indicative of a first capability of the first UE to perform ProSe communications, transmitting a second capability message indicative of a second capability of the first UE to perform joint processing for multiple-input multiple-output (MIMO) communications, where the joint processing includes assistance by one or more assisting UEs for reception of a message at an assisted UE, receiving, based on transmission of the first capability message and the second capability message, an indication that the first UE is to perform the joint processing with a second UE, and performing the joint processing with the second UE in accordance with the indication.

A first UE for wireless communications is described. The first UE may include one or more memories storing processor executable code, and one or more processors coupled with the one or more memories. The one or more processors may individually or collectively be operable to execute the code to cause the first UE to transmit, in accordance with ProSe discovery with a network entity, a first capability message indicative of a first capability of the first UE to perform ProSe communications, transmit a second capability message indicative of a second capability of the first UE to perform joint processing for MIMO communications, where the joint processing includes assistance by one or more assisting UEs for reception of a message at an assisted UE, receive, based on transmission of the first capability message and the second capability message, an indication that the first UE is to perform the joint processing with a second UE, and perform the joint processing with the second UE in accordance with the indication.

Another first UE for wireless communications is described. The first UE may include means for transmitting, in accordance with ProSe discovery with a network entity, a first capability message indicative of a first capability of the first UE to perform ProSe communications, means for transmitting a second capability message indicative of a second capability of the first UE to perform joint processing for MIMO communications, where the joint processing includes assistance by one or more assisting UEs for reception of a message at an assisted UE, means for receiving, based on transmission of the first capability message and the second capability message, an indication that the first UE is to perform the joint processing with a second UE, and means for performing the joint processing with the second UE in accordance with the indication.

A non-transitory computer-readable medium storing code for wireless communications is described. The code may include instructions executable by one or more processors to transmit, in accordance with ProSe discovery with a network entity, a first capability message indicative of a first capability of the first UE to perform ProSe communications, transmit a second capability message indicative of a second capability of the first UE to perform joint processing for MIMO communications, where the joint processing includes assistance by one or more assisting UEs for reception of a message at an assisted UE, receive, based on transmission of the first capability message and the second capability message, an indication that the first UE is to perform the joint processing with a second UE, and perform the joint processing with the second UE in accordance with the indication.

In some examples of the method, first UEs, and non-transitory computer-readable medium described herein, the second capability of the first UE indicates that the first UE may be capable to assist the second UE, during the joint processing, as a first assisting UE of the one or more assisting UEs, the second capability message may be also indicative of a decoding capability associated with the first UE being the first assisting UE to the second UE, and the decoding capability indicates whether the first UE may be capable of forwarding a processed signal or an unprocessed signal to the second UE.

In some examples of the method, first UEs, and non-transitory computer-readable medium described herein, the second capability message may be further indicative of a first processing delay associated with forwarding the processed signal, a second processing delay associated with forwarding the unprocessed signal, or both.

In some examples of the method, first UEs, and non-transitory computer-readable medium described herein, the second capability of the first UE indicates that the first UE may be capable of being assisted by the second UE, during the joint processing, as the assisted UE and the second capability message may be also indicative of a latency threshold associated with receiving the assistance from the second UE.

In some examples of the method, first UEs, and non-transitory computer-readable medium described herein, receiving the indication that the first UE may be to perform the joint processing with the second UE may include operations, features, means, or instructions for receiving an indication of whether the first UE may be to assist or be assisted by the second UE.

Some examples of the method, first UEs, and non-transitory computer-readable medium described herein may further include operations, features, means, or instructions for receiving, based on receiving the indication that the first UE may be to assist the second UE, an indication of a pilot sequence index associated with the second UE, where performing the joint processing may include operations, features, means, or instructions for processing, in accordance with the pilot sequence index, a downlink signal on behalf of the second UE and forwarding the processed downlink signal to the second UE.

In some examples of the method, first UEs, and non-transitory computer-readable medium described herein, the second capability of the first UE indicates that the first UE may be capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof.

In some examples of the method, first UEs, and non-transitory computer-readable medium described herein, receiving the indication that the first UE may be to perform the joint processing with the second UE may include operations, features, means, or instructions for receiving an indication of a pilot sequence index associated with the second UE, where performing the joint processing may include operations, features, means, or instructions for processing, in accordance with the pilot sequence index, a downlink signal and forwarding the processed downlink signal to the second UE.

In some examples of the method, first UEs, and non-transitory computer-readable medium described herein, receiving the indication that the first UE may be to perform the joint processing with the second UE may include operations, features, means, or instructions for receiving information indicative of a pilot sequence index associated with the second UE, and where performing the joint processing may include operations, features, means, or instructions for receiving a first processed downlink signal from the second UE, processing, in accordance with the pilot sequence index, a second downlink signal, and estimating an intra-cell interference based on receiving the first processed downlink signal and processing the second downlink signal.

Some examples of the method, first UEs, and non-transitory computer-readable medium described herein may further include operations, features, means, or instructions for receiving, based on transmission of the first capability message, a request for information associated with the ProSe communications at the first UE, where the information includes one or more UEs identified by the first UE via the ProSe discovery, one or more measurements of the one or more UEs identified by the first UE, a first delay associated with the ProSe discovery, a second delay associated with the ProSe communications, or any combination thereof and transmitting a response including the requested information, where receiving the indication that the first UE may be to perform the joint processing with the second UE may be based on transmission of the response.

In some examples of the method, first UEs, and non-transitory computer-readable medium described herein, the indication that the first UE may be to perform the joint processing with the second UE further indicates a type of joint processing to be performed, a downlink slot during which the joint processing may be performed, or both.

A method for wireless communications by a network entity is described. The method may include obtaining, in accordance with a ProSe discovery with two or more UEs, two or more first capability messages indicative of first capabilities of the two or more UEs to perform ProSe communications, obtaining at least two second capability messages indicative of second capabilities of at least a first UE and a second UE to perform joint processing in MIMO communications, where the joint processing includes assistance by one or more assisting UEs for reception of a message at an assisted UE, and outputting, based on reception of the two or more first capability messages and the at least two second capability messages, an indication that the first UE is to perform the joint processing with the second UE.

A network entity for wireless communications is described. The network entity may include one or more memories storing processor executable code, and one or more processors coupled with the one or more memories. The one or more processors may individually or collectively be operable to execute the code to cause the network entity to obtain, in accordance with a ProSe discovery with two or more UEs, two or more first capability messages indicative of first capabilities of the two or more UEs to perform ProSe communications, obtain at least two second capability messages indicative of second capabilities of at least a first UE and a second UE to perform joint processing in MIMO communications, where the joint processing includes assistance by one or more assisting UEs for reception of a message at an assisted UE, and output, based on reception of the two or more first capability messages and the at least two second capability messages, an indication that the first UE is to perform the joint processing with the second UE.

Another network entity for wireless communications is described. The network entity may include means for obtaining, in accordance with a ProSe discovery with two or more UEs, two or more first capability messages indicative of first capabilities of the two or more UEs to perform ProSe communications, means for obtaining at least two second capability messages indicative of second capabilities of at least a first UE and a second UE to perform joint processing in MIMO communications, where the joint processing includes assistance by one or more assisting UEs for reception of a message at an assisted UE, and means for outputting, based on reception of the two or more first capability messages and the at least two second capability messages, an indication that the first UE is to perform the joint processing with the second UE.

A non-transitory computer-readable medium storing code for wireless communications is described. The code may include instructions executable by one or more processors to obtain, in accordance with a ProSe discovery with two or more UEs, two or more first capability messages indicative of first capabilities of the two or more UEs to perform ProSe communications, obtain at least two second capability messages indicative of second capabilities of at least a first UE and a second UE to perform joint processing in MIMO communications, where the joint processing includes assistance by one or more assisting UEs for reception of a message at an assisted UE, and output, based on reception of the two or more first capability messages and the at least two second capability messages, an indication that the first UE is to perform the joint processing with the second UE.

Some examples of the method, network entities, and non-transitory computer-readable medium described herein may further include operations, features, means, or instructions for determining to couple the first UE with the second UE for the joint processing based on the two or more first capability messages, the at least two second capability messages, or both.

In some examples of the method, network entities, and non-transitory computer-readable medium described herein, at least one capability of the at least two second capabilities indicates that the first UE may be capable to assist the second UE, during the joint processing, as a first assisting UE of the one or more assisting UEs, at least one capability message may be also indicative of a decoding capability associated with the first UE being the first assisting UE to the second UE, and the decoding capability indicates whether the first UE may be capable of forwarding a processed signal or an unprocessed signal.

In some examples of the method, network entities, and non-transitory computer-readable medium described herein, at least one capability message may be further indicative of a first processing delay associated with forwarding the processed signal, a second processing delay associated with forwarding the unprocessed signal, or both.

In some examples of the method, network entities, and non-transitory computer-readable medium described herein, at least one capability of the at least two second capabilities indicates that the first UE may be capable of being assisted by the second UE during the joint processing, as the assisted UE and at least one capability message of the at least two second capability messages may be also indicative of a latency threshold associated with receiving the assistance from the second UE.

In some examples of the method, network entities, and non-transitory computer-readable medium described herein, outputting the indication that the first UE may be to perform the joint processing with the second UE may include operations, features, means, or instructions for outputting an indication of whether the first UE may be to assist or be assisted by the second UE.

In some examples of the method, network entities, and non-transitory computer-readable medium described herein, outputting the indication that the first UE may be to perform the joint processing with the second UE may include operations, features, means, or instructions for outputting an indication of a first pilot sequence index associated with the first UE, a second pilot sequence index associated with the second UE, or both.

In some examples of the method, network entities, and non-transitory computer-readable medium described herein, the second capabilities indicate that the first UE and the second UE may be capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Some wireless communications systems may support joint processing via Proximity Services or Proximity-Based Services (ProSe). For example, in some wireless communications systems, user equipments (UEs) within a threshold range or distance from each other may communicate directly. That is, proximate or nearby UEs may communicate using short-range, device-to-device (D2D) communication capabilities to support communications directly between UEs without cellular network infrastructure (e.g., via an unlicensed spectrum, without data being routed to a network entity). Because the ProSe communications involve shorter range communication relative to communication via the cellular network infrastructure, ProSe communications may support reduced latency. For example, latency may be reduced in accordance with transmission of a message from a UE directly to another UE (e.g., UE-to-UE communication) rather than the message being sent to another UE via a network entity (e.g., UE-to-network relay).

As described herein, one or more additional advantages associated with ProSe communications may be realized by supporting joint processing via the ProSe communications. For example, a network entity, a first UE, and a second UE may exchange information during ProSe discovery. For example, the ProSe discovery may involve transmission of capability messages by the first UE and the second UE to the network entity indicating capabilities associated with ProSe communications. The first UE and the second UE may additionally report capabilities associated with joint processing for a multiple-input multiple-output (MIMO) scenario (e.g., single user MIMO (SU-MIMO) or multiple user MIMO (MU-MIMO)). That is, UEs may report capabilities associated with both ProSe communications and joint processing to a network entity such that the network entity may pair UEs to perform joint processing via ProSe communications. The network entity may determine to couple the first UE and the second UE based on the capabilities and transmit a coupling indication. For example, the coupling indication may indicate that the first UE and the second UE are to perform joint processing. After receiving the coupling indication, the first UE and the second UE may perform joint processing.

Aspects of the disclosure are initially described in the context of wireless communications systems. Aspects of the disclosure are also described in the context of a process flow. Aspects of the disclosure are further illustrated by and described with reference to apparatus diagrams, system diagrams, and flowcharts that relate to techniques for joint demodulation via ProSe.

Figure 1:
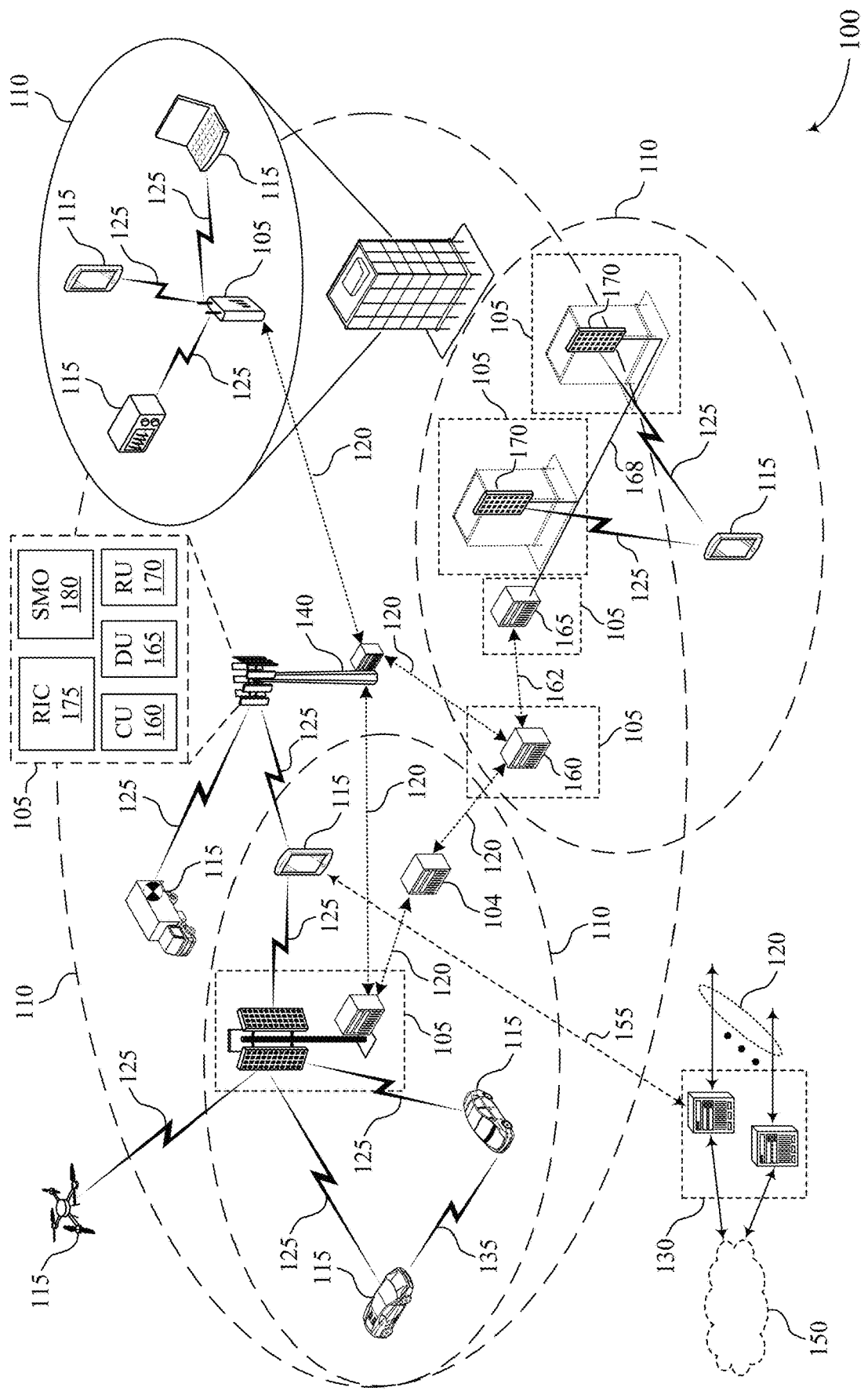
FIGS. 1 and 2 show examples of wireless communications systems that support techniques for joint demodulation via proximity services (ProSe) in accordance with various aspects of the present disclosure.

FIG. 1 shows an example of a wireless communications system 100 that supports techniques for joint demodulation via ProSe in accordance with various aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support ProSe communications. The ProSe communications may involve ProSe discovery in which ProSe devices may identify and locate nearby devices that support or are compatible with ProSe communication. For example, before UEs 115 may communicate via ProSe, the UEs 115 and the network entity 105 may perform ProSe or proximity discovery. The ProSe discovery may involve exchanging information about device capabilities, position, signal strength, supported services, and the like. For example, the ProSe discovery may involve UEs 115 reporting to the network entity 105 whether they are capable of ProSe communications (e.g., have a proximity capability). In some cases, the UEs 115 may indicate capabilities to perform ProSe communications at a beginning of a ProSe procedure or communication, based on receiving a request from the network entity 105 to indicate a ProSe capability, or both. For example, the network entity 105 may request that UEs 115 served by the network entity 105 report ProSe capabilities during ProSe discovery.

The network entity 105 may request additional information from the UEs 115 that reported capabilities to perform ProSe communications. For example, the network entity 105 may request information from UEs 115 having the capability to perform ProSe communication regarding ProSe discovery with other UEs (e.g., proximate UEs, UEs served by the network entity 105, etc.). The additional information may include which UEs 115 the UE 115 has identified via ProSe discovery. For example, a UE 115 may report one or more UEs within a threshold distance from the UE 115 (e.g., UEs=[#2, #6, #13]). The additional information may also include reference signal received power (RSRP) measurements associated with the identified UEs. For example, the UE 115 may report signal-to-noise ratios (SNRs) associated with each identified or candidate UE (e.g., SNR #2=45 dB, SNR #6=29 dB, SNR #13=14 dB). In some cases, the additional information may include expected delays associated with ProSe connection and communication. For example, the UE 115 may report an expected latency associated with communicating with the identified or candidate UEs, an amount of time expected to connect to the candidate UEs via a ProSe communication link, or the like. The additional information may include a position of the UE 115, the identified UEs, or both. For example, the UE 115 may include a position reference signals (PRSs) or another type of identifier of position for the UE 115, the identified UEs, or both.

The network entity 105 may request (e.g., ask for) periodic updates to the ProSe discovery. For example, the network entity 105 may request the information regarding ProSe discovery from the UEs 115 periodically (e.g., every x slots) according to policies or requirements at the network entity 105. According to the information provided by the UEs 115, the network entity 105 may determine whether to use ProSe communications and, if so, which UEs to couple (e.g., pair). In examples in which the network entity 105 identifies the UEs 115 to couple, the network entity 105 may transmit an indication to the UEs 115 indicating that they are to be coupled, a type of joint processing to be performed, a downlink slot that the joint processing is to be performed on, or any combination thereof.

In addition to or alternatively from the ProSe communications, the wireless communications system 100 may support joint processing. For example, UEs 115 may increase a quantity of effective antenna elements by using joint processing. That is, UEs 115 may use antenna elements of other UEs to improve one or more communications parameters. As an example, a first UE and a second UE may increase a quantity of simultaneous streams per resource element by performing joint processing. The quantity of simultaneous streams may increase to ($R_1+R_2$) streams, where $R_1$ and $R_2$ are the quantities of receive antennas at the first UE and the second UE respectively. Additionally, or alternatively, UEs 115 may increase a post-processing effective SNR, compensate for channel fading, or both based on increased antenna diversity. Processing via receive antennas of another UE may also increase a reliability level (e.g., serve as backup antennas) in examples in which the UE has faulty or blocked antennas. In examples of MU-MIMO, joint processing may support reduced (e.g., or eliminated) signal leakage between nearby UEs (e.g., within a threshold distance of each other). Additionally, or alternatively, joint processing may enable MU-MIMO in examples of high signal leakage due to proximity between UEs 115.

By supporting joint processing, the first UE and the second UE may increase a quantity of simultaneous streams per resource element, increase a post-processing effective signal-to-noise ratio (SNR), increase antenna diversity, reduce signal leakage, or any combination thereof. Additionally, or alternatively, by utilizing the antenna elements of both the first UE and the second UE to perform the joint processing, the UEs may increase an effective quantity (e.g., a usable quantity) of receive antennas, which may reduce intra-cell interference. Joint processing may be implemented in examples in which a relatively high quantity of streams per resource elements (e.g., up to 8 streams), a relatively high constellation order (e.g., up to 16,384 Quadrature Amplitude Modulation (QAM)), MU-MIMO, or any combination thereof are implemented in a wireless communications system or for a wireless communications device. Joint processing via the ProSe communications may enable UEs to be implemented in these examples, as the joint processing supports the increased quantity of effective receive antennas, increased post-processing SNR, reduced signal leakage, or any combination thereof.

One or more of the advantages associated with joint processing may be supported via a relatively low transmit power (e.g., −10 dBm or 0.1 mW) associated with ProSe communications, such as due to the proximity between the UEs 115. Accordingly, techniques described herein may support joint processing via ProSe communications. For example, techniques described herein may support establishment of D2D signaling for joint processing methods by using ProSe. These joint processing methods may benefit from an increased quantity of receive antennas and may reduce intra-cell interference. To support the joint processing, UEs may exchange information associated with the joint processing via D2D signaling (e.g., ProSe communications). The joint processing may be in an example of SU-MIMO, MU-MIMO, or the like.

Figure 2:
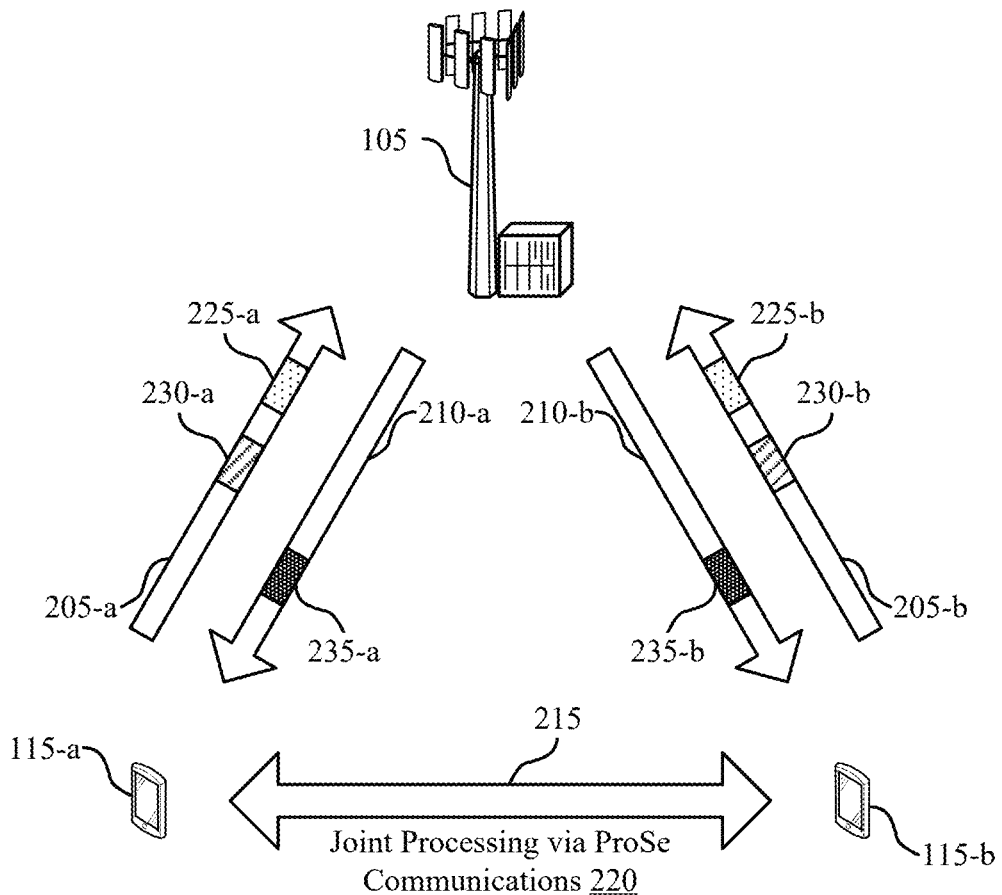

FIG. 2 shows an example of a wireless communications system 200 that supports techniques for joint demodulation via ProSe in accordance with various aspects of the present disclosure. The wireless communications system 200 may implement or be implemented by various aspects of the wireless communications system 100. For example, the wireless communications system 200 may include a network entity 105, a UE 115-a, and a UE 115-b, which may represent examples of corresponding devices as described with reference to FIG. 1. The UE 115-a and the UE 115-b may be examples of user devices, such as smartphones, smartwatches, extended reality (XR) devices (e.g., glasses), or IoT devices.

In the example of FIG. 2, the network entity 105, the UE 115-a, and the UE 115-b may support ProSe communications. For example, the communications link 215 may be an example of a ProSe communications link. That is, the communications link 215 may be an example of a short-range, D2D communications link (e.g., with reduced latency) between UEs, such as the UE 115-a and the UE 115-b. The communications link 215 may be associated with an unlicensed spectrum. For example, the communications link 215 may not be supported by cellular network infrastructure (e.g., not be supported by the network entity 105). Additionally, or alternatively, the communications link 215 may be associated with ultra-wide band (UWB) communications. The communications link 215, by supporting UWB communications, may support relatively small losses compared to other communications links, including a communications link 205-a or the communications link 205-b (e.g., uplink communications links) and the communications link 210-a or the communications link 210-b (e.g., downlink communications links).

To support joint decoding via ProSe communications, the network entity 105, the UE 115-a, and the UE 115-b may exchange one or more messages. For example, the network entity 105, the UE 115-a, and the UE 115-b may perform proximity discovery or ProSe discovery. In some examples, the network entity 105, the UE 115-a, and the UE 115-b may perform the proximity discovery to determine which of the UEs is capable of using ProSe for joint processing. The proximity discovery for joint processing may involve exchanging ProSe capabilities and joint processing capabilities. For example, the UE 115-a may transmit a ProSe capability message 225-a and the UE 115-b may transmit a ProSe capability message 225-b to the network entity 105. The ProSe capability message 225-a and the ProSe capability message 225-b may indicate capabilities of the UE 115-a and the UE 115-b, respectively, to support ProSe communications.

Additionally, the UE 115-a may transmit a joint processing capability message 230-a and the UE 115-b may transmit a joint processing capability message 230-b to the network entity 105. The joint processing capability message 230-a and the joint processing capability message 230-b may indicate capabilities of the UE 115-a and the UE 115-b to support joint processing. In some examples, the UE 115-a and the UE 115-b may transmit the joint processing capability message 230-a and the joint processing capability message 230-b, respectively, based on receiving a request from the network entity 105. For example, the network entity 105 may request that UEs which reported capabilities to support ProSe communications via the ProSe capability messages report capabilities associated with joint processing. Additionally, or alternatively, the network entity 105 may request that the UE 115-a and the UE 115-b report joint processing capabilities associated with SU-MIMO, MU-MIMO (e.g., successive interference cancelation (SIC)), or both. For example, the joint processing capability messages may include different information or capabilities based on whether the UEs are performing SU-MIMO communications or MU-MIMO communications.

In the example of SU-MIMO, joint processing via ProSe communications 220 may involve an assisted UE and an assisting UE, where the assisting UE helps another UE with downlink decoding. In such examples, the joint processing capability message (e.g., the response to the request from the network entity 105) may indicate whether the UE is capable of assisting or being assisted by another UE. In some examples, the capability to assist may be in a different capability message than the capability to be assisted. That is, in examples in which the UE is capable of both assisting and being assisted, the UE may transmit two different capability messages, such as a first joint processing capability message and a second joint processing capability message, including different information associated with providing joint processing assistance and associated with receiving joint processing assistance, respectively. In the example of SU-MIMO for FIG. 2, the UE 115-a may report joint processing capabilities associated with assisting another UE, and the UE 115-b may report joint processing capabilities associated with receiving assistance form another UE. However, it may be understood that the UE 115-a may additionally report (e.g., via a same or different message) joint processing capabilities associated with receiving assistance from another UE, and the UE 115-b may report (e.g., via a same or different message) joint processing capabilities associated with assisting another UE.

In examples in which the UE 115-a indicates a capability of assisting another UE, the joint processing capability message 230-a may include an indication of whether the UE 115-a is capable of decoding the received signal (e.g., and transmitting a resulting log likelihood ratio (LLR)) or sending received measurements (e.g., receive antenna measurements) without decoding. That is, the UE 115-a may indicate a capability of forwarding processed or unprocessed signals as an assisting UE in the joint processing capability message 230-a. Additionally, or alternatively, the UE 115-a may indicate processing delays associated with decoding the received signal or sending the received measurements. In other words, the UE 115-a may indicate a processing delay associated with forwarding processed signals (e.g., LLRs) and a processing delay associated with forwarding unprocessed signals (e.g., measurements). In some examples, the UE 115-a may indicate the processing delays based on whether the UE 115-a is capable of forwarding processed or unprocessed signals. That is, the UE 115-a may include processing delays for assistance types (e.g., forwarding processed signals, forwarding unprocessed signals, etc.) that the UE 115-a is capable of performing.

In examples in which the UE 115-b indicates a capability of being assisted by another UE, the joint processing capability message 230-b may include a ProSe latency threshold. That is, the UE 115-b may indicate a maximum ProSe latency that the UE 115-b may afford, such as based on latency policies or requirements at the UE 115-b. Additionally, or alternatively, the UE 115-b may request a processed signal (e.g., LLRs) or an unprocessed signal (e.g., measurements). In some examples, the UE 115-b may request the processed or the unprocessed signal from an assisting UE based on processing delays indicated by the assisting UE. That is, the UE 115-b may request either processed or unprocessed signals to be forwarded by the UE 115-a based on the processing delays associated with forwarding processed and unprocessed signals included in the joint processing capability message 230-a of the UE 115-a.

In the example of MU-MIMO, the UE 115-a and the UE 115-b may indicate capabilities to send hard decisions or soft decisions based on hardware capabilities, latencies, or both. For example, the joint processing capability message 230-a and the joint processing capability message 230-b may indicate a capability of the UE 115-a and the UE 115-b, respectively, to send hard decisions, soft decisions, or both to another UE based on a hardware capability (e.g., requirement) of the UE 115-a or the UE 115-b, latency thresholds of the UE 115-a or the UE 115-b, or both. Additionally, or alternatively, the UE 115-a and the UE 115-b may indicate a preference associated with receiving hard decisions or soft decisions. For example, the UE 115-a and the UE 115-b may indicate a request associated with receiving hard decisions or soft decisions based on a respective hard or soft SIC. In some examples, the UE 115-a, the UE 115-b, or both may request a soft decision for a portion of code blocks and a hard decision for a different portion of code blocks.

Additionally, or alternatively, the UE 115-a and the UE 115-b, respectively, may indicate processing delays associated with sending hard or soft decisions. In other words, the UE 115-a and the UE 115-a may each indicate a processing delay associated with transmitting hard decisions and a processing delay associated with transmitting soft decisions. In some examples, the UE 115-a and the UE 115-b may indicate the processing delays based on a capability of forwarding hard or soft decisions. That is, the UE 115-a and the UE 115-b may each include processing delays for assistance types (e.g., forwarding hard decisions, forwarding soft decisions, etc.) that the UE 115-a and the UE 115-b, respectively, are capable of performing.

In some examples, the joint processing capability message 230-a and the joint processing capability message 230-b may include a ProSe latency threshold. That is, the UE 115-a and the UE 115-b may each indicate a maximum ProSe latency that the UE may afford, such as based on latency policies or requirements at the UE 115-a and the UE 115-b, respectively. Additionally, or alternatively, the UE 115-a and the UE 115-b may indicate whether the UE supports receiving a hard decision or a soft decision. In some examples, the UE 115-a or the UE 115-b may indicate either hard or soft decisions based on processing delay requirements (e.g., latency and power device tradeoff with SNR).

Based on receiving the ProSe capability messages and the joint processing capability messages, the network entity 105 may determine which UEs to pair for joint processing (e.g., for one or more upcoming slots). For example, the network entity 105 may determine to couple the UE 115-a and the UE 115-b based on a proximity of the UEs (e.g., RSRPs, PRSs, or another metric indicative of proximity). That is, the network entity 105 may determine to couple the UE 115-a and the UE 115-b based on ProSe discovery information from the UEs (e.g., indicated via the ProSe capability message or another message). Additionally, or alternatively, the network entity 105 may determine to couple the UE 115-a and the UE 115-b based on a combination of the capabilities of each UE (e.g., based on the joint processing capability messages). In some examples, the network entity 105 may determine to couple the UE 115-a and the UE 115-b based on requirements of a cell of the network entity 105, the UE 115-a, the UE 115-b, or any combination thereof. In the example of SU-MIMO, the network entity 105 may pair the UE 115-a with the UE 115-b based on the UE 115-a indicating a capability to assist and the UE 115-b indicating a capability to be assisted, based on indicated processing delays of the UE 115-a and ProSe latency thresholds of the UE 115-b, or the like. In the example of MU-MIMO, the network entity 105 may determine which UE is to start the joint processing via ProSe communications 220 based on SNRs of the UE 115-a and the UE 115-b (e.g., a better SNR of the UE 115-a and the UE 115-b).

The network entity 105 may transmit a joint processing indications to the UE 115-a and the UE 115-b based on determining to pair the UEs. In the example of SU-MIMO, the network entity 105 may transmit a joint processing indication 235-a to the UE 115-a indicating that the UE 115-a is to assist the UE 115-b in one or more slots. In examples in which the UE 115-a forwards processed signals (e.g., LLRs) to the UE 115-b, the joint processing indication 235-a may include a pilot sequences index of the UE 115-b. Additionally, the network entity 105 may transmit a joint processing indication 235-b to the UE 115-b indicating that the UE 115-*b* is to be assisted by the UE 115-*a*. The joint processing indication 235-*a* and the joint processing indication 235-*b* may indicate one or more slots associated with the joint processing via ProSe communications 220. For example, the joint processing indication 235-*b* and the joint processing indication 235-*b* may identify one or more downlink slots in which the UE 115-*b* is to receive a downlink message via the UE 115-*a* (e.g., forwarded by the UE 115-*a* to the UE 115-*b*). In some examples, the joint processing indication 235-*a* and the joint processing indication 235-*b* may indicate that the UE 115-*a* is to be the assisting UE in one or more first slots and that the UE 115-*b* is to be the assisting UE in one or more second slots. That is, the joint processing indication 235-*a* and the joint processing indication 235-*b* may indicate which of the UEs is assisting and which is assisted in each slot of a set of multiple slots.

In the example of MU-MIMO, the network entity 105 may transmit a joint processing indication 235-*a* to the UE 115-*a* and a joint processing indication 235-*b* to the UE 115-*b* indicating which UE is to start the joint processing. For example, the network entity 105 may indicate that the UE 115-*a* is to start the joint processing via ProSe communications 220, such as by forwarding a first downlink message (e.g., including a hard decision or soft decision) to the UE 115-*b*. Each of the joint processing indication 235-*a* and the joint processing indication 235-*b* may include the pilot sequence index of the other UE. That is, the joint processing indication 235-*a* may include the pilot sequence index of the UE 115-*b*, and the joint processing indication 235-*b* may include the pilot sequence index of the UE 115-*a*.

The UE 115-*a* and the UE 115-*b* may perform joint processing via ProSe communications 220 via the communications link 215 based on receiving the joint processing indication 235-*a* and the joint processing indication 235-*b*, respectively. For example, the network entity 105 may transmit a downlink signal to the UE 115-*a* and the UE 115-*b*, where the UE 115-*a* and the UE 115-*b* perform joint processing via ProSe communications 220 to process the downlink signal.

In the example of SU-MIMO, the UE 115-*a* may transmit unprocessed information (e.g., measurements) or processed information (e.g., LLRs) associated with the downlink signal to the UE 115-*b* based on the joint processing indication 235-*a* (e.g., based on an agreement between the UE 115-*a* and the UE 115-*b* to perform joint processing). That is, the UE 115-*a* may receive the downlink signal (e.g., for the UE 115-*b*) and process the downlink signal to assist the UE 115-*b*. The UE 115-*a* may process the downlink signal based on the pilot sequence index of the UE 115-*b*. That is, in order to process the downlink signal for the UE 115-*b*, the UE 115-*a* may have (e.g., be required to have) the pilot sequence index of the UE 115-*b*. After processing the downlink signal, the UE 115-*a* may transmit one or more LLRs (e.g., calculated LLRs) to the UE 115-*b* via the communications link 215 (e.g., via ProSe communications). Alternatively, the UE 115-*a* may transmit receive antenna measurements of the downlink signal (e.g., without processing) to the UE 115-*b* via the communications link 215 (e.g., via ProSe communications). The UE 115-*b*, based on receiving the one or more LLRs or the antenna measurements, may perform joint processing (e.g., CHEST, equalization, LLRs, etc.) on the downlink signal received from the network entity 105 and the signal (e.g., processed or unprocessed) received from the UE 115-*a* via ProSe communications. By performing the joint processing via ProSe communications 220, the UE 115-*a* and the UE 115-*b* may support improved SNR, a relatively high quantity of layers, and an increased effective quantity of antennas compared to processing without assistance. For example, the joint processing via ProSe communications may support $R_1+R_2$ layers and effective antennas, where $R_1$ is a quantity of receive antennas of the UE 115-*a* and $R_2$ is the quantity of receive antennas of the UE 115-*b*.

In the example of MU-MIMO, the network entity 105 may transmit $R_1$ layers to the UE 115-*a* and $R_2$ layers to the UE 115-*b* via same resources (e.g., frequency domain and time domain resources). The UE 115-*a*, the UE 115-*b*, or both may perform joint processing according to SIC, which may be defined by Equation 1 and Equation 2 below, where $y_i$ are the received signals at $UE_i$, $x_i$ are the data or pilots that are intended for the $UE_i$, and $H_{ij}$ is the corresponding channel.

$$y_1 = H_{11}x_1 + \underbrace{H_{12}x_2}_{interference} + n \qquad (1)$$

$$y_2 = H_{22}x_2 + \underbrace{H_{21}x_1}_{interference} + n \qquad (2)$$

The UE 115-*a* may receive the signal $y_i$ and perform channel estimation of the channel $H_{i1}$ according to the pilot sequence index of the UE 115-*a*. Additionally, the UE 115-*a* may perform channel estimation of the channel $H_{12}$ according to the pilot sequence index of the UE 115-*b*. The UE 115-*a* may perform initial decoding of the signal $y_1$ and transmit an indication of hard decisions or soft decisions, $x_1$, associated with the decoding to the UE 115-*b* via the communications link 215 (e.g., via ProSe communications). The UE 115-*b* may receive the signal $y_2$ from the network entity 105 and perform channel estimation of $H_{22}$ based on the pilot sequence index of the UE 115-*b*. Additionally, the UE 115-*b* may perform channel estimation of the channel $H_{21}$ according to the pilot sequence index of the UE 115-*a*. After performing the channel estimations, the UE 115-*b* may subtract the interference (e.g., leakage) $H_{21}x_1$ based on the ProSe message from the UE 115-*a* and perform decoding on the data $x_2$. The UE 115-*b* may transmit an indication of hard decisions or soft decisions, $x_2$, to the UE 115-*a*. The UE 115-*a* may subtract the interference (e.g., leakage) $H_{12}x_2$ based on the ProSe message from the UE 115-*b* and repeat the decoding procedure. The UE 115-*a* and the UE 115-*b* may repeat decoding of the signals $y_1$ and $y_2$ based on satisfying an error threshold (e.g., until an error threshold is satisfied).

In some examples, the network entity 105 may update the coupling. That is, the network entity 105 may transmit additional joint processing indications to the UE 115-*a*, the UE 115-*b*, or both indicating an update to the joint processing via ProSe communications 220. In some examples, the network entity 105 may transmit updated joint processing indications based on a policy at the network entity 105, requirements of the cell, or both. Additionally, or alternatively, the network entity 105 may transmit the updated joint processing indications based on a request from the network entity 105, the UE 115-*a*, or the UE 115-*b* to terminate the D2D connectivity. For example, a device may request to terminate the D2D connectivity based on one of the UE 115-*a* or the UE 115-*b* changing a location within the cell, entering a low battery mode, or otherwise changing an operating parameter such that the UE 115-*a* or the UE 115-*b* cannot support ProSe communications and/or joint processing. Additionally, or alternatively, a device may request to terminate the D2D connectivity based on latency thresholds or other device requirements. In examples in which the network entity 105 receives the request to terminate the D2D connectivity, the network entity 105 may initiate ProSe discovery (e.g., again) to determine which UEs to couple. The additional joint processing indications may replace information included in the joint processing indication 235-a, the joint processing indication 235-b, or both. For example, in the example of SU-MIMO, the network entity 105 may change the UE 115-b to be the assisting UE and the UE 115-a to be the assisted UE (e.g., switch the assisting and assisted UEs).

Figure 3:
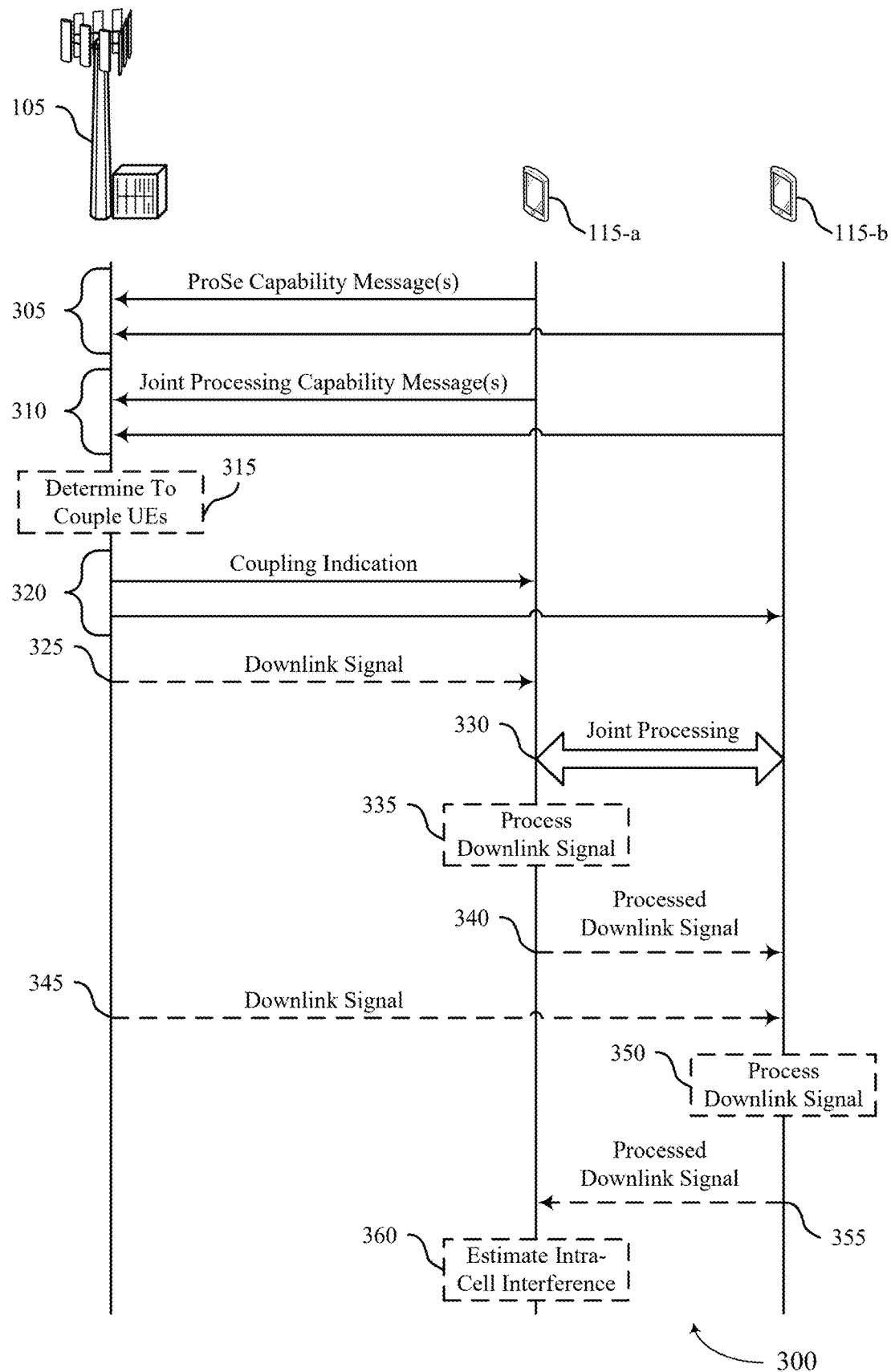
FIG. 3 shows an example of a process flow that supports techniques for joint demodulation via ProSe in accordance with various aspects of the present disclosure.

FIG. 3 shows an example of a process flow 300 that supports techniques for joint demodulation via ProSe in accordance with various aspects of the present disclosure. The process flow 300 may implement or be implemented by aspects of the wireless communications system 100, the wireless communications system 200, or both as described with reference to FIGS. 1 and 2. For example, the process flow 300 may include a network entity 105, a UE 115-a, and a UE 115-b, which may be examples of corresponding devices as described with reference to FIGS. 1 and 2.

Alternative examples of the following may be implemented, where some operations are performed in a different order than described or are not performed at all. In some cases, operations may include additional features not mentioned below, or further operations may be added. Although the network entity 105, the UE 115-a, and the UE 115-b are shown performing the operations of the process flow 300, some aspects of some operations may also be performed by one or more other wireless devices.

At 305, the network entity 105 may obtain ProSe capability messages from the UE 115-a and the UE 115-b. For example, the network entity 105 may obtain, in accordance with a ProSe discovery with two or more UEs (e.g., including the UE 115-a and the UE 115-b), two or more first capability messages indicative of first capabilities of the two or more UEs to perform ProSe communications. In other words, the UEs 115 may transmit, in accordance with ProSe discovery with the network entity 105, a first capability message indicative of a first capability of the UE 115-a and the UE 115-b, respectively to perform ProSe communications. The first capability message may be an example of the ProSe capability message, such as the ProSe capability message 225-a or the ProSe capability message 225-b as described with reference to FIG. 2.

In some examples, based on transmitting the first capability message, the UEs 115 may receive a request for information associated with the ProSe communications at the UE 115-a and the UE 115-b, respectively, where the information includes one or more UEs identified by the UE 115-a and the UE 115-b, respectively, via the ProSe discovery, one or more measurements of the one or more UEs identified by the UE 115-a and the UE 115-b, respectively, a first delay associated with the ProSe discovery, a second delay associated with the ProSe communications, or any combination thereof. That is, the UEs 115 may receive requests for information associated with ProSe communications based on indicating a capability to perform ProSe communications at 305. The UEs 115 may transmit a response including the requested information. For example, the UE 115-a may transmit a response including the information, where the response includes an identification of the UE 115-b, one or more measurements associated with the UE 115-b, or both.

At 310, the network entity 105 may obtain joint processing capability messages from the UE 115-a and the UE 115-b. For example, the network entity 105 may obtain at least two second capability messages indicative of second capabilities of at least the UE 115-a and the UE 115-b to perform joint processing in MIMO communications (e.g., SU-MIMO and/or MU-MIMO), where the joint processing includes assistance by one or more assisting UEs for reception of a message at an assisted UE. In other words, the UEs 115 may transmit a second capability message indicative of a second capability of the UE 115-a and the UE 115-b, respectively, to perform joint processing for MIMO communications, where the joint processing includes assistance by one or more assisting UEs for reception of a message at an assisted UE. The second capability message may be an example of the joint processing capability message, such as the joint processing capability message 230-a or the joint processing capability message 230-b as described with reference to FIG. 2.

The joint processing capability message (e.g., the second capability message) of the UE 115-a may indicate that the UE 115-a is capable to assist the UE 115-b, during the joint processing, as a first assisting UE of the one or more assisting UEs. In such examples, the joint processing capability message may also be indicative of a decoding capability associated with the UE 115-a being the first assisting UE to the UE 115-b, where the decoding capability indicates whether the UE 115-a is capable of forwarding a processed signal or an unprocessed signal to the UE 115-b. In some examples, the joint processing capability message may further be indicative of a first processing delay associated with forwarding the processed signal, a second processing delay associated with forwarding the unprocessed signal, or both. Alternatively, the joint processing capability message of the UE 115-a may indicate that the UE 115-a is capable of being assisted by the UE 115-b, during the joint processing, as the assisted UE. In such examples, the joint processing capability message may also be indicative of a latency threshold associated with receiving the assistance from the UE 115-b. The UEs 115 may indicate capabilities associated with assisting or being an assisted UE for SU-MIMO communications.

In some examples, the joint processing capability message of the UE 115-a may indicate that the UE 115-a is capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof. The UEs 115 may indicate capabilities associated with hard decisions or soft decisions for MU-MIMO communications.

At 315, the network entity 105 may determine to couple the UEs 115. For example, the network entity 105 may determine to couple the UE 115-a with the UE 115-b for the joint processing based on the two or more first capability messages (e.g., received at 305), the at least two second capability messages (e.g., received at 310), or both. Additionally, or alternatively, the network entity 105 may determine to couple the UEs 115 based on receiving the requested information associated with ProSe communications.

At 320, the network entity 105 may output a coupling indication to the UE 115-a and the UE 115-b. For example, the network entity 105 may output, based on reception of the two or more first capability messages (e.g., received at 305) and the at least two second capability messages (e.g., received at 310), an indication that the UE 115-a is to perform the joint processing with the UE 115-b. In some examples, the network entity 105 may output the coupling indication based on determining to couple the UEs 115 at 315. The UEs 115 may receive, based on transmission of the first capability message (e.g., at 305) and the second capability message (e.g., at 310), an indication that the UE 115-*a* is to perform the joint processing with the UE 115-*b*. The indication may be an example of the coupling indication or a joint processing indication, such as the joint processing indication 235-*a* or the joint processing indication 235-*b* as described with reference to FIG. 2. In some examples, receiving the indication that the UE 115-*a* is to perform the joint processing with the UE 115-*b* is based on transmission of the response to the requested information (e.g., based on providing the information about ProSe communications).

The coupling indication may indicate whether the UE 115-*a* is to assist or be assisted by the UE 115-*b* (e.g., for SU-MIMO). In examples in which the UE 115-*a* is to assist the UE 115-*b*, the UE 115-*a* may receive an indication of a pilot sequence index associated with the UE 115-*b*. For example, the UE 115-*a* may receive the indication of the pilot sequence index of the UE 115-*b* such that the UE 115-*a* may forward processed downlink signals to the UE 115-*b* (e.g., at 340). Additionally, or alternatively, in examples in which the UE 115-*a* performs joint processing with the UE 115-*b* (e.g., for MU-MIMO), the UE 115-*a* may receive information indicative of the pilot sequence index associated with the UE 115-*b*, and the UE 115-*b* may receive the information indicative of the pilot sequence index associated with the UE 115-*a*.

The indication that the UE 115-*a* is to perform the joint processing with the UE 115-*b* may further indicate a type of joint processing to be performed, a downlink slot during which the joint processing is to be performed, or both. For example, the indication may identify different joint processing configurations (e.g., different assisting or assisted UEs, forwarding processed or unprocessed signals, sending hard or soft decisions, etc.) for different slots. The type of joint processing to be performed may refer to whether the UE 115-*a* is to forward processed or unprocessed signals, whether the UE 115-*a* is to forward hard or soft decisions, whether the UE 115-*b* is to forward hard or soft decisions, or any combination thereof.

At 325, the network entity 105 may transmit a downlink signal to the UE 115-*a*. For example, the network entity 105 may transmit the downlink signal to the UE 115-*a*, where the downlink signal is intended for the UE 115-*b* (e.g., but sent to the UE 115-*a* in accordance with the joint processing indicated via the coupling indication at 320).

At 330, the UE 115-*a* and the UE 115-*b* may perform joint processing. For example, the UE 115-*a* may perform the joint processing with the UE 115-*b* in accordance with the indication (e.g., at 320). In examples in which the UE 115-*a* is an assisting UE (e.g., for SU-MIMO communications), at 335, the UE 115-*a* may process the downlink signal. For example, the UE 115-*a* may process, in accordance with the pilot sequence index associated with the UE 115-*b*, the downlink signal on behalf of the UE 115-*b*. At 340, the UE 115-*a* may transmit the processed downlink signal to the UE 115-*b*. For example, the UE 115-*a* may forward the processed downlink signal to the UE 115-*b*. Alternatively, the UE 115-*a* may forward measurements associated with the downlink signal (e.g., without processing) to the UE 115-*b*.

In examples in which the UE 115-*a* starts the joint processing (e.g., for MU-MIMO communications), at 335, the UE 115-*a* may process the downlink signal. For example, the UE 115-*a* may process, in accordance with Equation 1 as described with reference to FIG. 2, the downlink signal. At 340, the UE 115-*a* may forward a hard or soft decision to the UE 115-*b*. At 345, the network entity 105 may output a downlink signal to the UE 115-*b*. For example, the UE 115-*b* may receive the downlink signal (e.g., different than the downlink signal at 325). At 350, the UE 115-*b* may process the downlink signal. For example, the UE 115-*b* may process the downlink signal in accordance with Equation 2 as described with reference to FIG. 2. At 355, the UE 115-*b* may transmit the processed downlink signal to the UE 115-*a*. That is, the UE 115-*b* may forward a hard to soft decision to the UE 115-*a*. The UE 115-*a* may receive the processed downlink signal from the UE 115-*b*. The UE 115-*a* and the UE 115-*b* may receive additional downlink signals and exchange hard and soft decisions in accordance with satisfying an error threshold. That is, in some examples, the UE 115-*a* may process another (e.g., different) downlink signal, and based on receiving the processed downlink signal and processing the other downlink signal, the UE 115-*a* may estimate an intra-cell interference. For example, at 360, the UE 115-*a* may estimate intra-cell interference.

Figure 4:
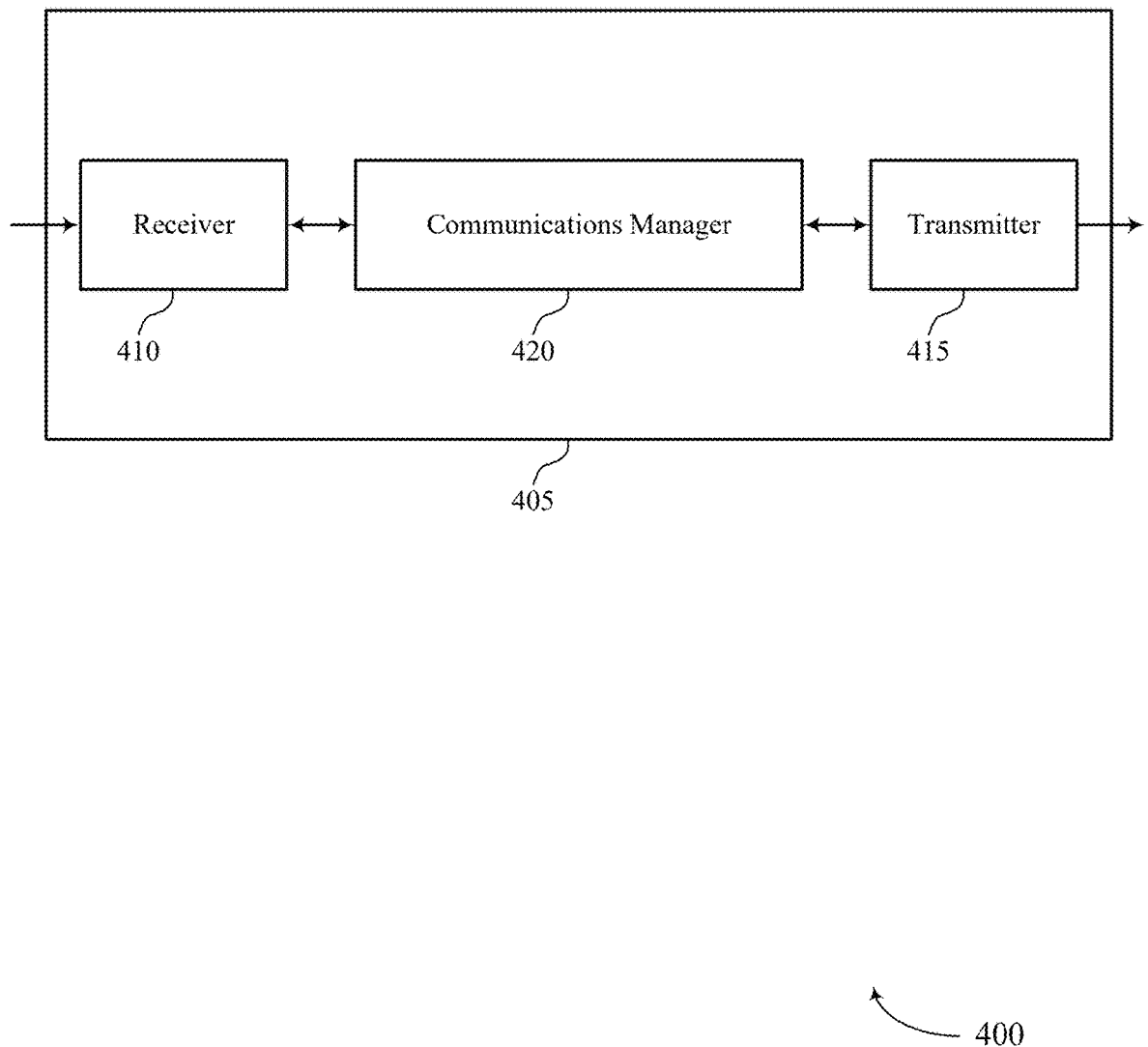
FIGS. 4 and 5 show block diagrams of devices that support techniques for joint demodulation via ProSe in accordance with various aspects of the present disclosure.

FIG. 4 shows a block diagram 400 of a device 405 that supports techniques for joint demodulation via ProSe in accordance with various aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for joint demodulation via ProSe). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for joint demodulation via ProSe). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations or components thereof may be examples of means for performing various aspects of techniques for joint demodulation via ProSe as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for transmitting, in accordance with proximity-based service (ProSe) discovery with a network entity, a first capability message indicative of a first capability of the first UE to perform ProSe communications. The communications manager 420 is capable of, configured to, or operable to support a means for transmitting a second capability message indicative of a second capability of the first UE to perform joint processing for multiple-input multiple-output (MIMO) communications, where the joint processing includes assistance by one or more assisting UEs for reception of a message at an assisted UE. The communications manager 420 is capable of, configured to, or operable to support a means for receiving, based on transmission of the first capability message and the second capability message, an indication that the first UE is to perform the joint processing with a second UE. The communications manager 420 is capable of, configured to, or operable to support a means for performing the joint processing with the second UE in accordance with the indication.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for improved SNR, reduced signal leakage, and more efficient utilization of communication resources.

Figure 5:
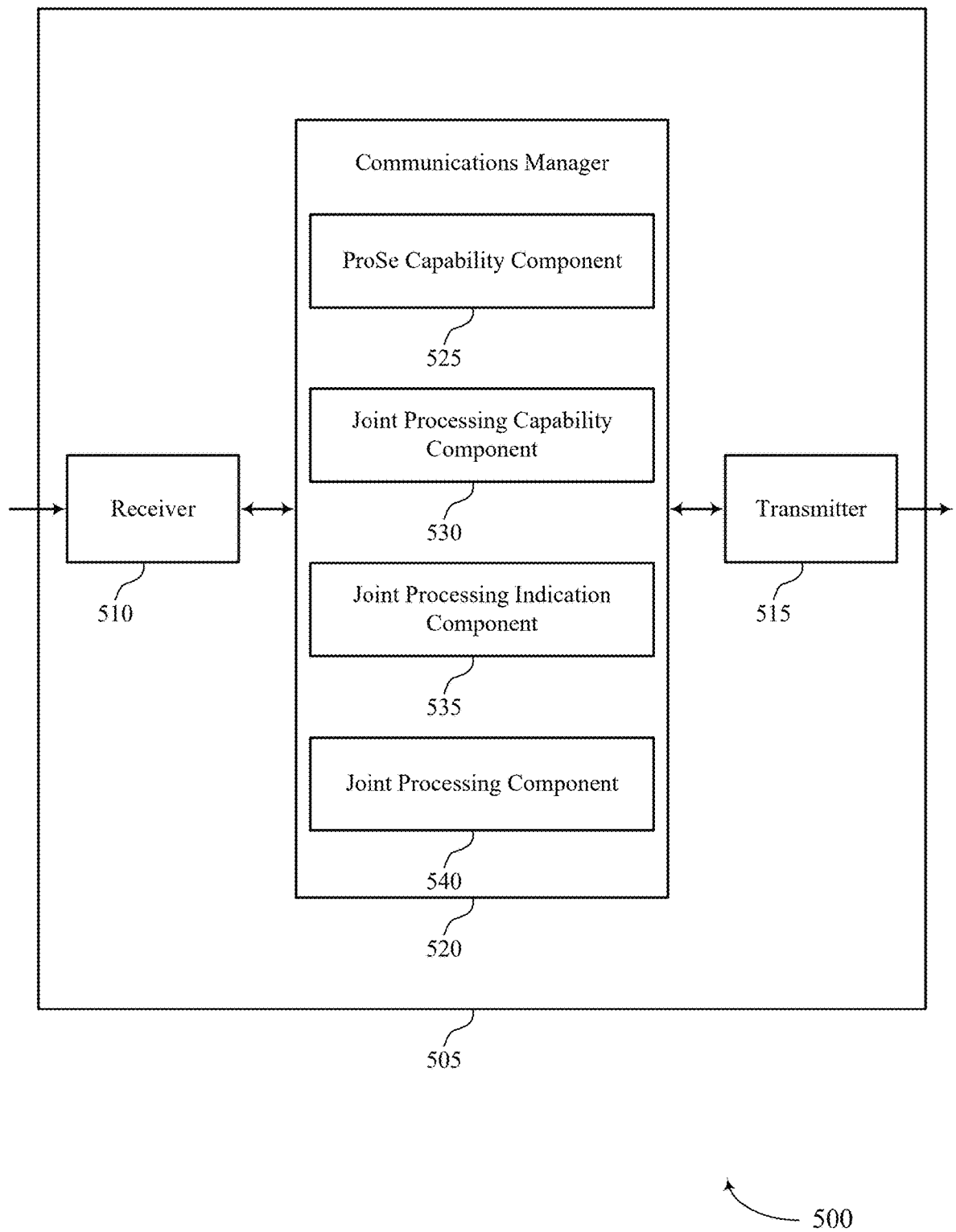

FIG. 5 shows a block diagram 500 of a device 505 that supports techniques for joint demodulation via ProSe in accordance with various aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for joint demodulation via ProSe). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for joint demodulation via ProSe). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for joint demodulation via ProSe as described herein. For example, the communications manager 520 may include a ProSe capability component 525, a joint processing capability component 530, a joint processing indication component 535, a joint processing component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The ProSe capability component 525 is capable of, configured to, or operable to support a means for transmitting, in accordance with proximity-based service (ProSe) discovery with a network entity, a first capability message indicative of a first capability of the first UE to perform ProSe communications. The joint processing capability component 530 is capable of, configured to, or operable to support a means for transmitting a second capability message indicative of a second capability of the first UE to perform joint processing for multiple-input multiple-output (MIMO) communications, where the joint processing includes assistance by one or more assisting UEs for reception of a message at an assisted UE. The joint processing indication component 535 is capable of, configured to, or operable to support a means for receiving, based on transmission of the first capability message and the second capability message, an indication that the first UE is to perform the joint processing with a second UE. The joint processing component 540 is capable of, configured to, or operable to support a means for performing the joint processing with the second UE in accordance with the indication.

Figure 6:
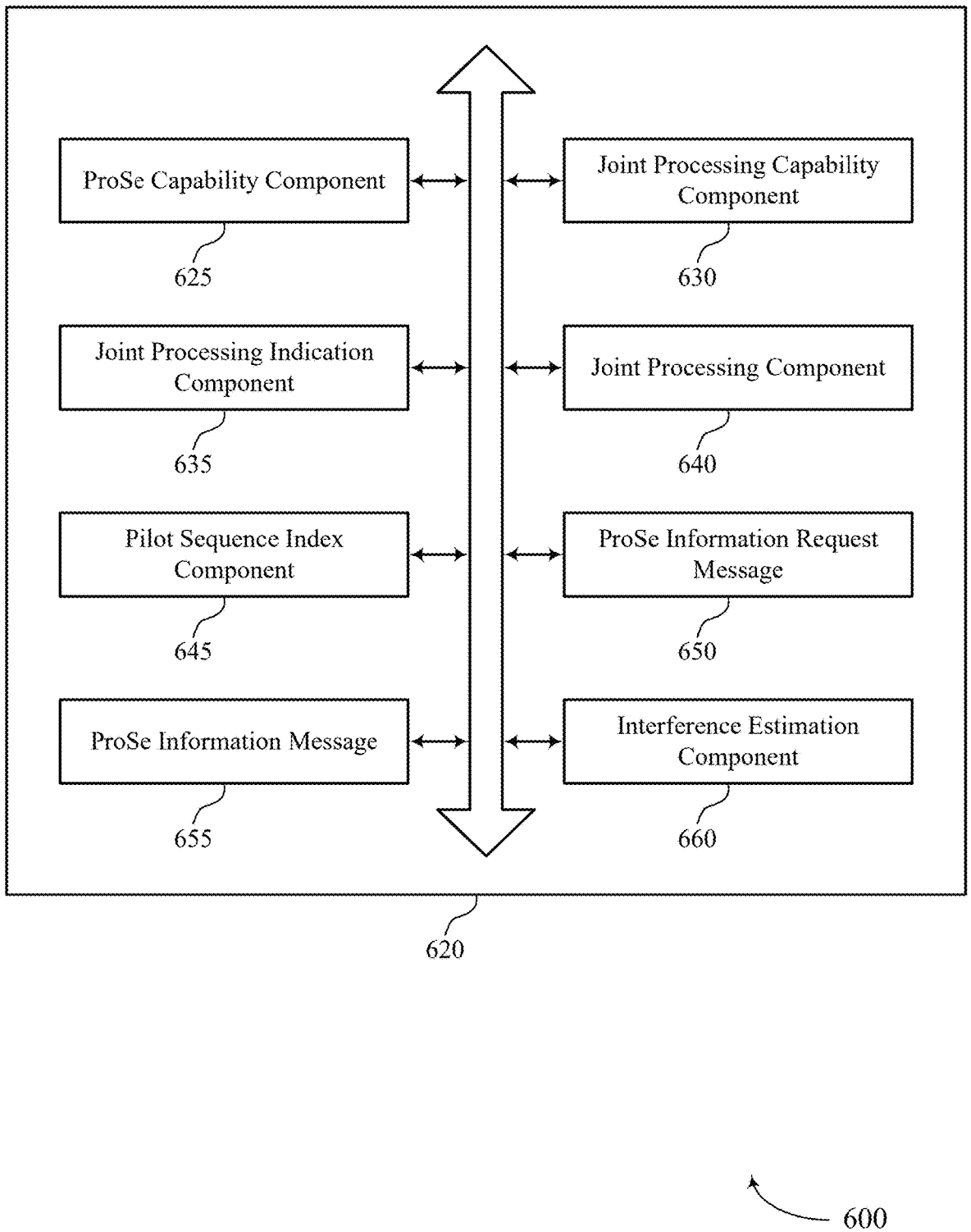
FIG. 6 shows a block diagram of a communications manager that supports techniques for joint demodulation via ProSe in accordance with various aspects of the present disclosure.

FIG. 6 shows a block diagram 600 of a communications manager 620 that supports techniques for joint demodulation via ProSe in accordance with various aspects of the present disclosure. The communications manager 620 may be an example of aspects of a communications manager 420, a communications manager 520, or both, as described herein. The communications manager 620, or various components thereof, may be an example of means for performing various aspects of techniques for joint demodulation via ProSe as described herein. For example, the communications manager 620 may include a ProSe capability component 625, a joint processing capability component 630, a joint processing indication component 635, a joint processing component 640, a pilot sequence index component 645, a ProSe information request message 650, a ProSe information message 655, an interference estimation component 660, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The ProSe capability component 625 is capable of, configured to, or operable to support a means for transmitting, in accordance with proximity-based service (ProSe) discovery with a network entity, a first capability message indicative of a first capability of the first UE to perform ProSe communications. The joint processing capability component 630 is capable of, configured to, or operable to support a means for transmitting a second capability message indicative of a second capability of the first UE to perform joint processing for multiple-input multiple-output (MIMO) communications, where the joint processing includes assistance by one or more assisting UEs for reception of a message at an assisted UE. The joint processing indication component 635 is capable of, configured to, or operable to support a means for receiving, based on transmission of the first capability message and the second capability message, an indication that the first UE is to perform the joint processing with a second UE. The joint processing component 640 is capable of, configured to, or operable to support a means for performing the joint processing with the second UE in accordance with the indication.

In some examples, the second capability of the first UE indicates that the first UE is capable to assist the second UE, during the joint processing, as a first assisting UE of the one or more assisting UEs. In some examples, the second capability message is also indicative of a decoding capability associated with the first UE being the first assisting UE to the second UE. In some examples, the decoding capability indicates whether the first UE is capable of forwarding a processed signal or an unprocessed signal to the second UE.

In some examples, the second capability message is further indicative of a first processing delay associated with forwarding the processed signal, a second processing delay associated with forwarding the unprocessed signal, or both.

In some examples, the second capability of the first UE indicates that the first UE is capable of being assisted by the second UE, during the joint processing, as the assisted UE.

In some examples, the second capability message is also indicative of a latency threshold associated with receiving the assistance from the second UE.

In some examples, to support receiving the indication that the first UE is to perform the joint processing with the second UE, the joint processing indication component 635 is capable of, configured to, or operable to support a means for receiving an indication of whether the first UE is to assist or be assisted by the second UE.

In some examples, the pilot sequence index component 645 is capable of, configured to, or operable to support a means for receiving, based on receiving the indication that the first UE is to assist the second UE, an indication of a pilot sequence index associated with the second UE. In some examples, to perform the joint processing, the joint processing component 640 is capable of, configured to, or operable to support a means for processing, in accordance with the pilot sequence index, a downlink signal on behalf of the second UE and the joint processing component 640 is capable of, configured to, or operable to support a means for forwarding the processed downlink signal to the second UE.

In some examples, the second capability of the first UE indicates that the first UE is capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof.

In some examples, to support receiving the indication that the first UE is to perform the joint processing with the second UE, the pilot sequence index component 645 is capable of, configured to, or operable to support a means for receiving an indication of a pilot sequence index associated with the second UE. In some examples, to perform the joint processing, the joint processing component 640 is capable of, configured to, or operable to support a means for processing, in accordance with the pilot sequence index, a downlink signal and the joint processing component 640 is capable of, configured to, or operable to support a means for forwarding the processed downlink signal to the second UE.

In some examples, to support receiving the indication that the first UE is to perform the joint processing with the second UE, the pilot sequence index component 645 is capable of, configured to, or operable to support a means for receiving information indicative of a pilot sequence index associated with the second UE. In some examples, to perform the joint processing, the joint processing component 640 is capable of, configured to, or operable to support a means for receiving a first processed downlink signal from the second UE, the joint processing component 640 is capable of, configured to, or operable to support a means for processing, in accordance with the pilot sequence index, a second downlink signal, and the interference estimation component 660 is capable of, configured to, or operable to support a means for estimating an intra-cell interference based on receiving the first processed downlink signal and processing the second downlink signal.

In some examples, the ProSe information request message 650 is capable of, configured to, or operable to support a means for receiving, based on transmission of the first capability message, a request for information associated with the ProSe communications at the first UE, where the information includes one or more UEs identified by the first UE via the ProSe discovery, one or more measurements of the one or more UEs identified by the first UE, a first delay associated with the ProSe discovery, a second delay associated with the ProSe communications, or any combination thereof. In some examples, the ProSe information message 655 is capable of, configured to, or operable to support a means for transmitting a response including the requested information, where receiving the indication that the first UE is to perform the joint processing with the second UE is based on transmission of the response.

In some examples, the indication that the first UE is to perform the joint processing with the second UE further indicates a type of joint processing to be performed, a downlink slot during which the joint processing is to be performed, or both.

Figure 7:
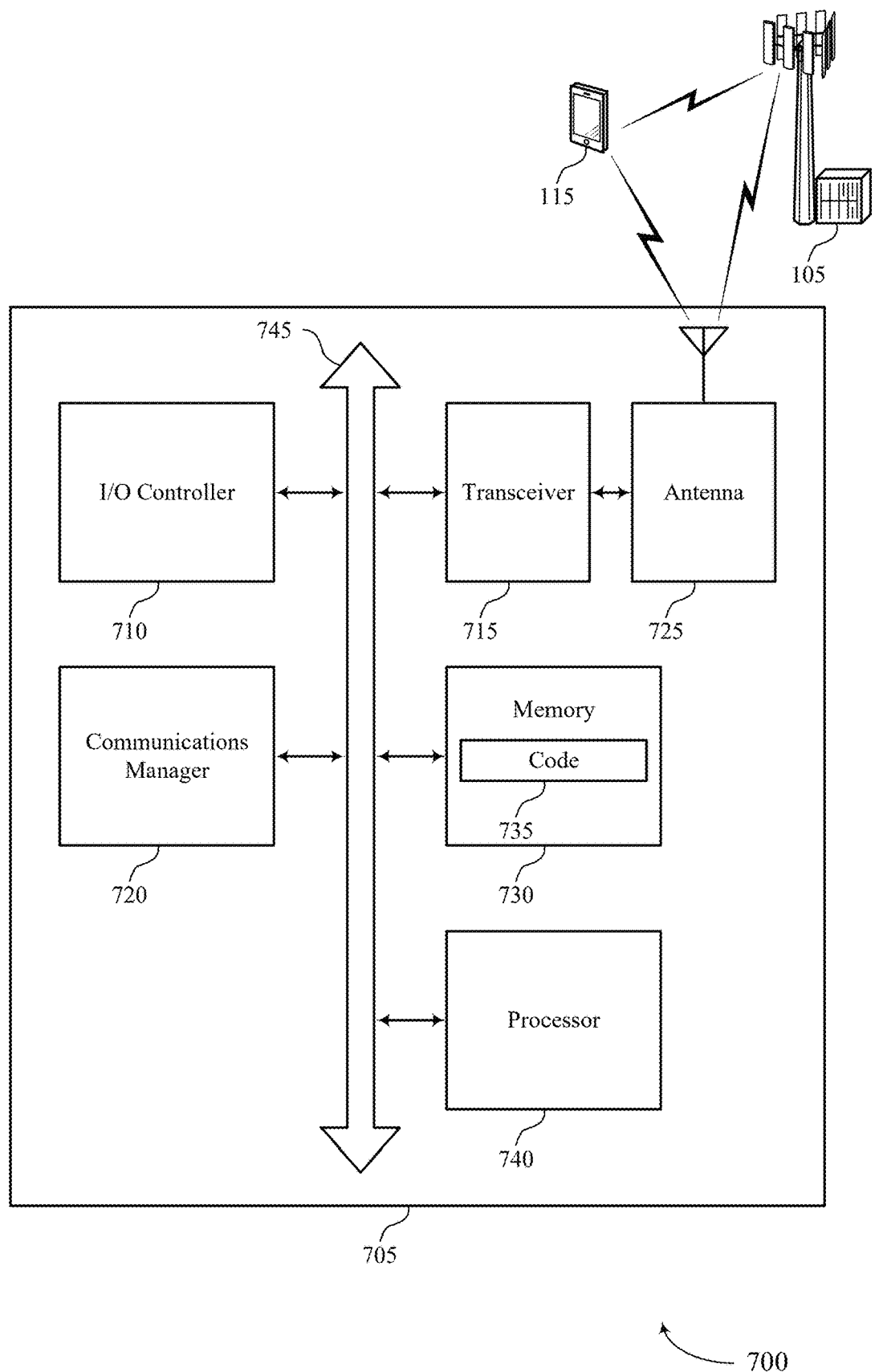
FIG. 7 shows a diagram of a system including a device that supports techniques for joint demodulation via ProSe in accordance with various aspects of the present disclosure.

FIG. 7 shows a diagram of a system 700 including a device 705 that supports techniques for joint demodulation via ProSe in accordance with various aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting techniques for joint demodulation via ProSe). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for transmitting, in accordance with proximity-based service (ProSe) discovery with a network entity, a first capability message indicative of a first capability of the first UE to perform ProSe communications. The communications manager 720 is capable of, configured to, or operable to support a means for transmitting a second capability message indicative of a second capability of the first UE to perform joint processing for multiple-input multiple-output (MIMO) communications, where the joint processing includes assistance by one or more assisting UEs for reception of a message at an assisted UE. The communications manager 720 is capable of, configured to, or operable to support a means for receiving, based on transmission of the first capability message and the second capability message, an indication that the first UE is to perform the joint processing with a second UE. The communications manager 720 is capable of, configured to, or operable to support a means for performing the joint processing with the second UE in accordance with the indication.

By including or configuring the communications manager 720 in accordance with examples as described herein, the device 705 may support techniques for improved communication reliability, reduced latency, more efficient utilization of communication resources, and improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of techniques for joint demodulation via ProSe as described herein, or the at least one processor 740 and the at least one memory 730 may be otherwise configured to, individually or collectively, perform or support such operations.

Figure 8:
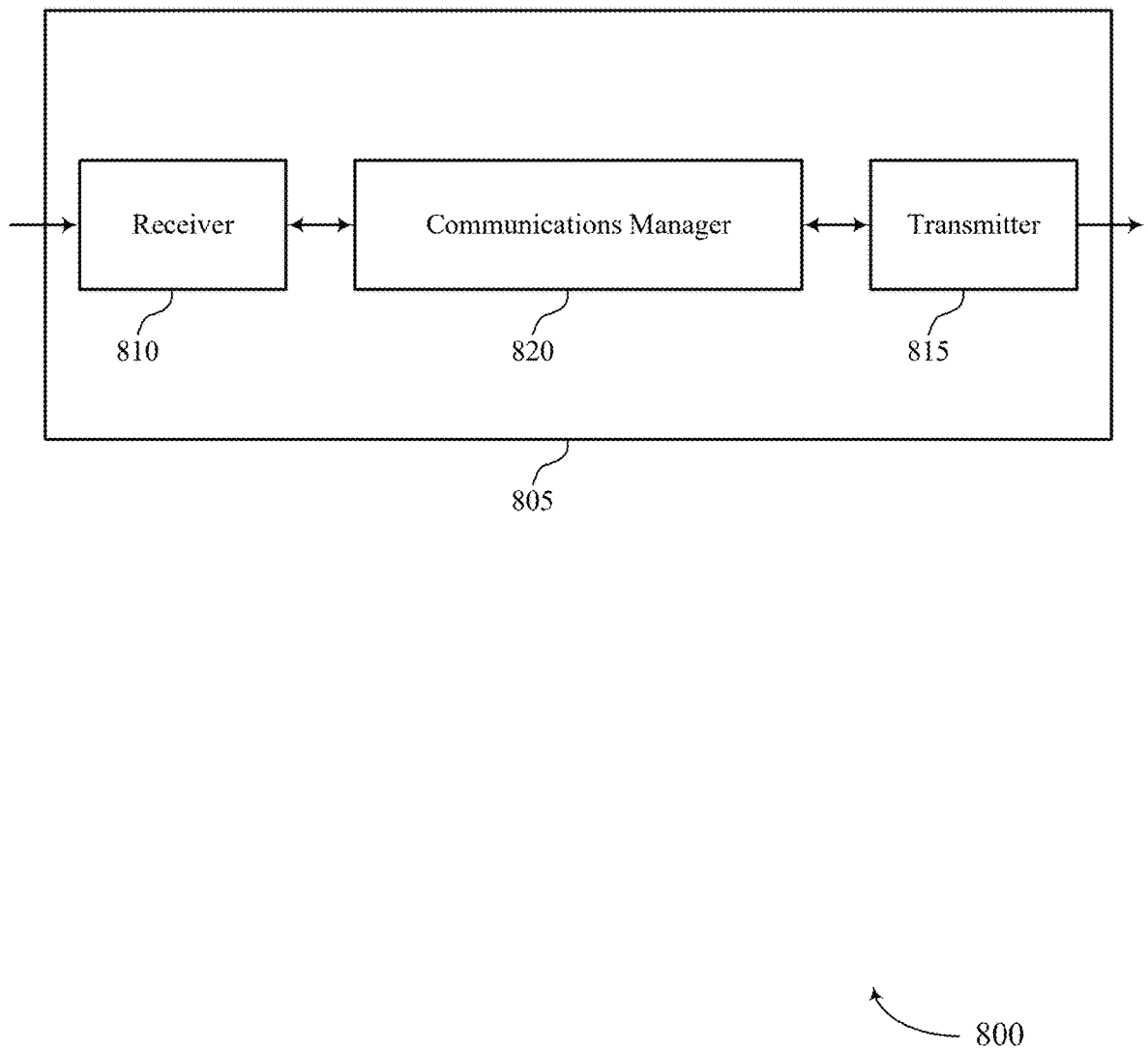
FIGS. 8 and 9 show block diagrams of devices that support techniques for joint demodulation via ProSe in accordance with various aspects of the present disclosure.

FIG. 8 shows a block diagram 800 of a device 805 that supports techniques for joint demodulation via ProSe in accordance with various aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of techniques for joint demodulation via ProSe as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for obtaining, in accordance with a proximity-based service (ProSe) discovery with two or more user equipments (UEs), two or more first capability messages indicative of first capabilities of the two or more UEs to perform ProSe communications. The communications manager 820 is capable of, configured to, or operable to support a means for obtaining at least two second capability messages indicative of second capabilities of at least a first UE and a second UE to perform joint processing in multiple-input multiple-output (MIMO) communications, where the joint processing includes assistance by one or more assisting UEs for reception of a message at an assisted UE. The communications manager 820 is capable of, configured to, or operable to support a means for outputting, based on reception of the two or more first capability messages and the at least two second capability messages, an indication that the first UE is to perform the joint processing with the second UE.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for improved SNR, reduced signal leakage, and more efficient utilization of communication resources.

Figure 9:
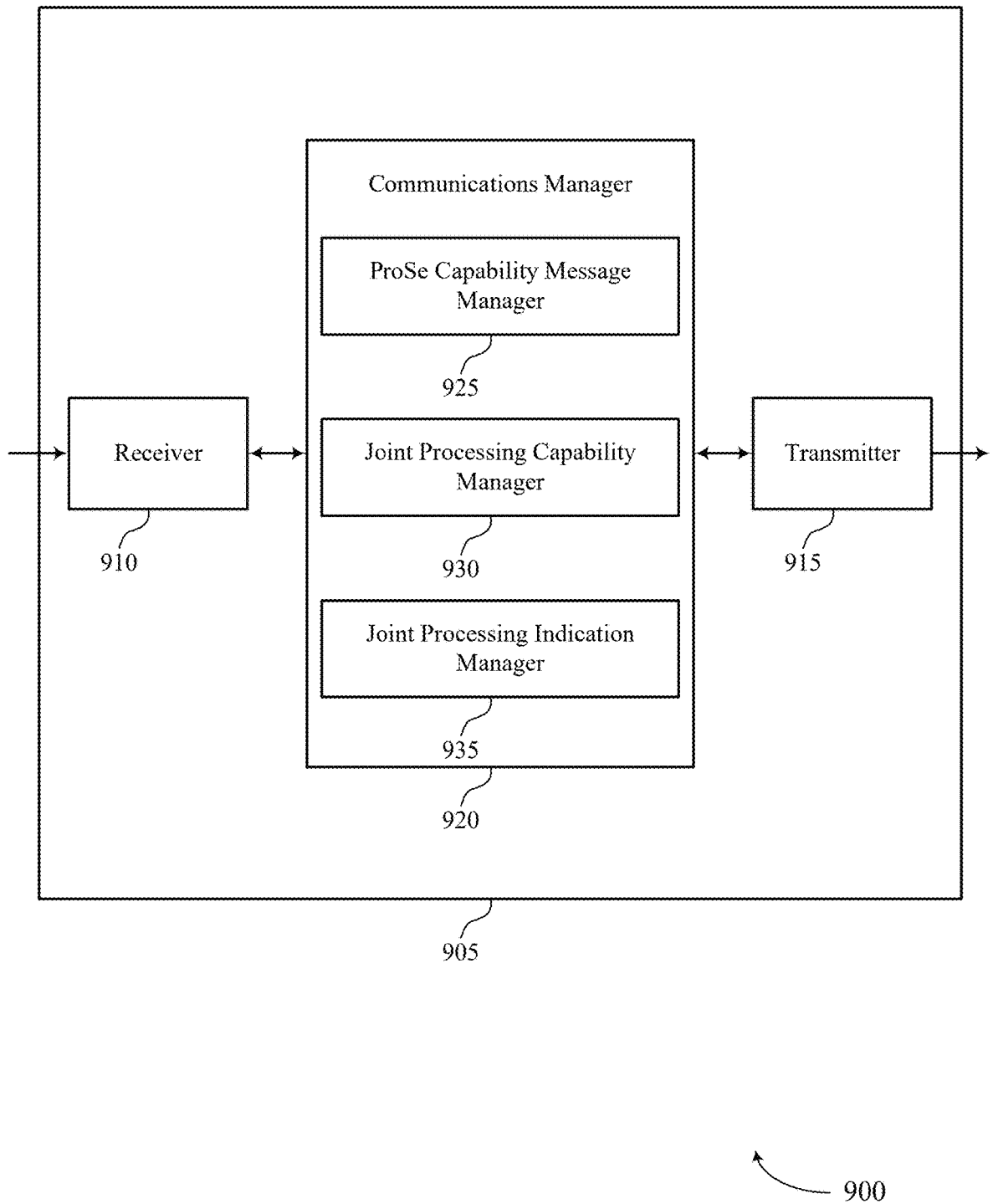

FIG. 9 shows a block diagram 900 of a device 905 that supports techniques for joint demodulation via ProSe in accordance with various aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for joint demodulation via ProSe as described herein. For example, the communications manager 920 may include a ProSe capability message manager 925, a joint processing capability manager 930, a joint processing indication manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The ProSe capability message manager 925 is capable of, configured to, or operable to support a means for obtaining, in accordance with a proximity-based service (ProSe) discovery with two or more user equipments (UEs), two or more first capability messages indicative of first capabilities of the two or more UEs to perform ProSe communications. The joint processing capability manager 930 is capable of, configured to, or operable to support a means for obtaining at least two second capability messages indicative of second capabilities of at least a first UE and a second UE to perform joint processing in multiple-input multiple-output (MIMO) communications, where the joint processing includes assistance by one or more assisting UEs for reception of a message at an assisted UE. The joint processing indication manager 935 is capable of, configured to, or operable to support a means for outputting, based on reception of the two or more first capability messages and the at least two second capability messages, an indication that the first UE is to perform the joint processing with the second UE.

Figure 10:
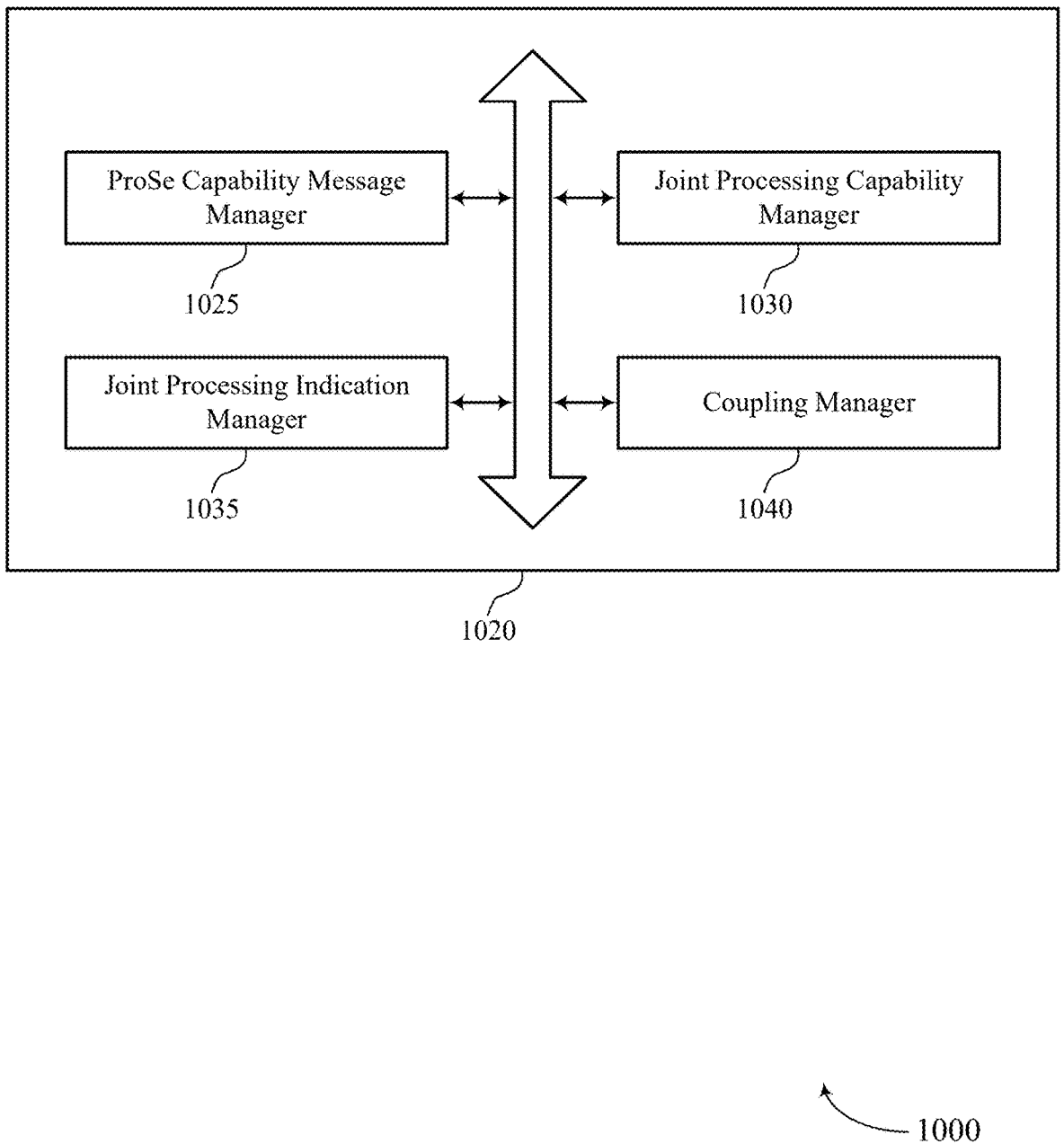
FIG. 10 shows a block diagram of a communications manager that supports techniques for joint demodulation via ProSe in accordance with various aspects of the present disclosure.

FIG. 10 shows a block diagram 1000 of a communications manager 1020 that supports techniques for joint demodulation via ProSe in accordance with various aspects of the present disclosure. The communications manager 1020 may be an example of aspects of a communications manager 820, a communications manager 920, or both, as described herein. The communications manager 1020, or various components thereof, may be an example of means for performing various aspects of techniques for joint demodulation via ProSe as described herein. For example, the communications manager 1020 may include a ProSe capability message manager 1025, a joint processing capability manager 1030, a joint processing indication manager 1035, a coupling manager 1040, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The ProSe capability message manager 1025 is capable of, configured to, or operable to support a means for obtaining, in accordance with a proximity-based service (ProSe) discovery with two or more user equipments (UEs), two or more first capability messages indicative of first capabilities of the two or more UEs to perform ProSe communications. The joint processing capability manager 1030 is capable of, configured to, or operable to support a means for obtaining at least two second capability messages indicative of second capabilities of at least a first UE and a second UE to perform joint processing in multiple-input multiple-output (MIMO) communications, where the joint processing includes assistance by one or more assisting UEs for reception of a message at an assisted UE. The joint processing indication manager 1035 is capable of, configured to, or operable to support a means for outputting, based on reception of the two or more first capability messages and the at least two second capability messages, an indication that the first UE is to perform the joint processing with the second UE.

In some examples, the coupling manager 1040 is capable of, configured to, or operable to support a means for determining to couple the first UE with the second UE for the joint processing based on the two or more first capability messages, the at least two second capability messages, or both.

In some examples, at least one capability of the at least two second capabilities indicates that the first UE is capable to assist the second UE, during the joint processing, as a first assisting UE of the one or more assisting UEs. In some examples, at least one capability message is also indicative of a decoding capability associated with the first UE being the first assisting UE to the second UE. In some examples, the decoding capability indicates whether the first UE is capable of forwarding a processed signal or an unprocessed signal.

In some examples, at least one capability message is further indicative of a first processing delay associated with forwarding the processed signal, a second processing delay associated with forwarding the unprocessed signal, or both.

In some examples, at least one capability of the at least two second capabilities indicates that the first UE is capable of being assisted by the second UE during the joint processing, as the assisted UE. In some examples, at least one capability message of the at least two second capability messages is also indicative of a latency threshold associated with receiving the assistance from the second UE.

In some examples, to support outputting the indication that the first UE is to perform the joint processing with the second UE, the joint processing indication manager 1035 is capable of, configured to, or operable to support a means for outputting an indication of whether the first UE is to assist or be assisted by the second UE.

In some examples, to support outputting the indication that the first UE is to perform the joint processing with the second UE, the joint processing indication manager 1035 is capable of, configured to, or operable to support a means for outputting an indication of a first pilot sequence index associated with the first UE, a second pilot sequence index associated with the second UE, or both.

In some examples, the second capabilities indicate that the first UE and the second UE are capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof.

Figure 11:
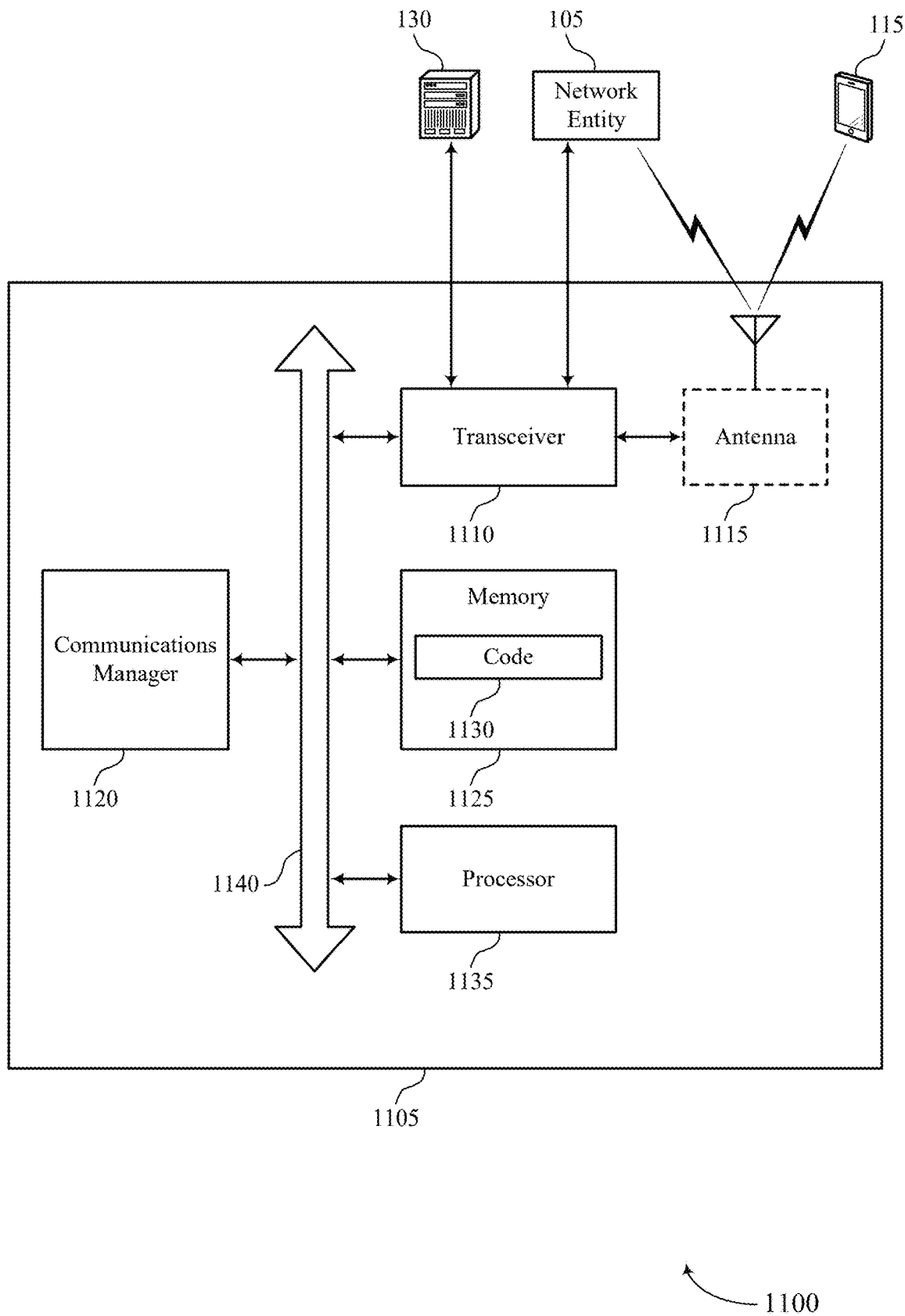
FIG. 11 shows a diagram of a system including a device that supports techniques for joint demodulation via ProSe in accordance with various aspects of the present disclosure.

FIG. 11 shows a diagram of a system 1100 including a device 1105 that supports techniques for joint demodulation via ProSe in accordance with various aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting techniques for joint demodulation via ProSe). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125).

In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network entities 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for obtaining, in accordance with a proximity-based service (ProSe) discovery with two or more user equipments (UEs), two or more first capability messages indicative of first capabilities of the two or more UEs to perform ProSe communications. The communications manager 1120 is capable of, configured to, or operable to support a means for obtaining at least two second capability messages indicative of second capabilities of at least a first UE and a second UE to perform joint processing in multiple-input multiple-output (MIMO) communications, where the joint processing includes assistance by one or more assisting UEs for reception of a message at an assisted UE. The communications manager 1120 is capable of, configured to, or operable to support a means for outputting, based on reception of the two or more first capability messages and the at least two second capability messages, an indication that the first UE is to perform the joint processing with the second UE.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of techniques for joint demodulation via ProSe as described herein, or the at least one processor 1135 and the at least one memory 1125 may be otherwise configured to, individually or collectively, perform or support such operations.

Figure 12:
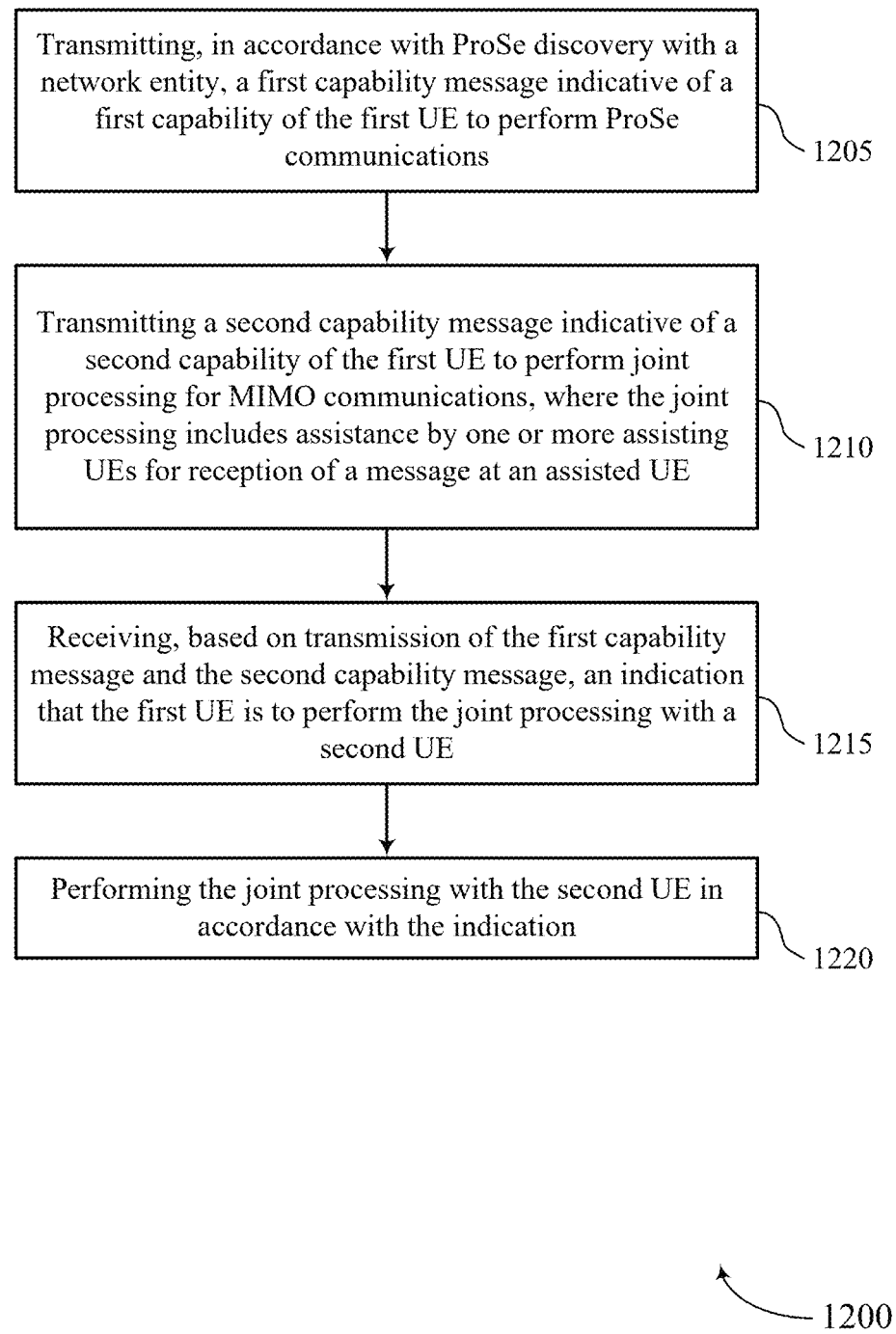
FIGS. 12 through 15 show flowcharts illustrating methods that support techniques for joint demodulation via ProSe in accordance with various aspects of the present disclosure.

FIG. 12 shows a flowchart illustrating a method 1200 that supports techniques for joint demodulation via ProSe in accordance with various aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting, in accordance with proximity-based service (ProSe) discovery with a network entity, a first capability message indicative of a first capability of the first UE to perform ProSe communications. The operations of 1205 may be performed in accordance with examples as disclosed herein. In some examples, aspects of the operations of 1205 may be performed by a ProSe capability component 625 as described with reference to FIG. 6.

At 1210, the method may include transmitting a second capability message indicative of a second capability of the first UE to perform joint processing for multiple-input multiple-output (MIMO) communications, where the joint processing includes assistance by one or more assisting UEs for reception of a message at an assisted UE. The operations of 1210 may be performed in accordance with examples as disclosed herein. In some examples, aspects of the operations of 1210 may be performed by a joint processing capability component 630 as described with reference to FIG. 6.

At 1215, the method may include receiving, based on transmission of the first capability message and the second capability message, an indication that the first UE is to perform the joint processing with a second UE. The operations of 1215 may be performed in accordance with examples as disclosed herein. In some examples, aspects of the operations of 1215 may be performed by a joint processing indication component 635 as described with reference to FIG. 6.

At 1220, the method may include performing the joint processing with the second UE in accordance with the indication. The operations of 1220 may be performed in accordance with examples as disclosed herein. In some examples, aspects of the operations of 1220 may be performed by a joint processing component 640 as described with reference to FIG. 6.

Figure 13:
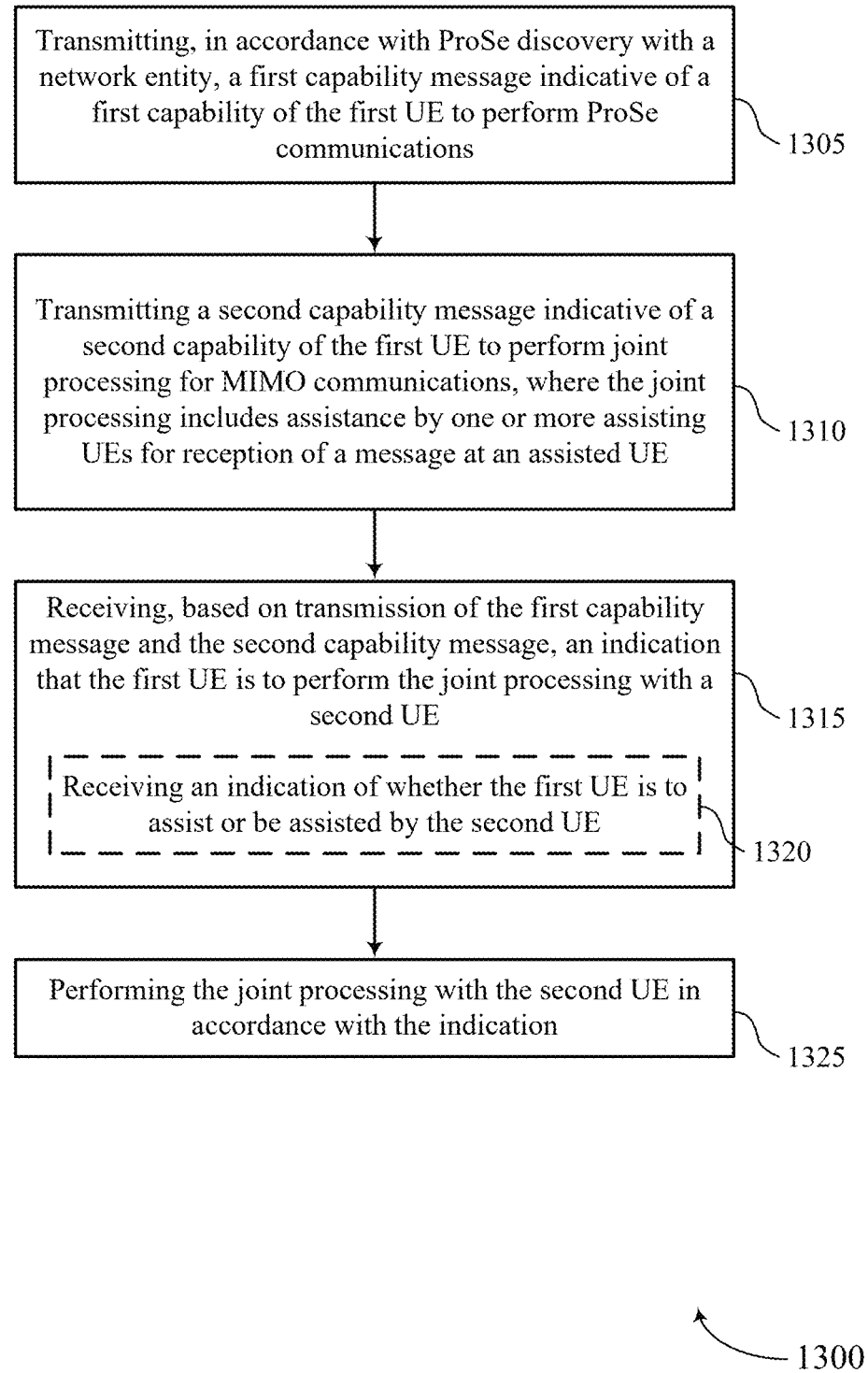

FIG. 13 shows a flowchart illustrating a method 1300 that supports techniques for joint demodulation via ProSe in accordance with various aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting, in accordance with proximity-based service (ProSe) discovery with a network entity, a first capability message indicative of a first capability of the first UE to perform ProSe communications. The operations of 1305 may be performed in accordance with examples as disclosed herein. In some examples, aspects of the operations of 1305 may be performed by a ProSe capability component 625 as described with reference to FIG. 6.

At 1310, the method may include transmitting a second capability message indicative of a second capability of the first UE to perform joint processing for multiple-input multiple-output (MIMO) communications, where the joint processing includes assistance by one or more assisting UEs for reception of a message at an assisted UE. The operations of 1310 may be performed in accordance with examples as disclosed herein. In some examples, aspects of the operations of 1310 may be performed by a joint processing capability component 630 as described with reference to FIG. 6.

At 1315, the method may include receiving, based on transmission of the first capability message and the second capability message, an indication that the first UE is to perform the joint processing with a second UE. The operations of 1315 may be performed in accordance with examples as disclosed herein. In some examples, aspects of the operations of 1315 may be performed by a joint processing indication component 635 as described with reference to FIG. 6.

At 1320, receiving the indication that the first UE is to perform the joint processing with the second may include receiving an indication of whether the first UE is to assist or be assisted by the second UE. The operations of 1320 may be performed in accordance with examples as disclosed herein. In some examples, aspects of the operations of 1320 may be performed by a joint processing indication component 635 as described with reference to FIG. 6.

At 1325, the method may include performing the joint processing with the second UE in accordance with the indication. The operations of 1325 may be performed in accordance with examples as disclosed herein. In some examples, aspects of the operations of 1325 may be performed by a joint processing component 640 as described with reference to FIG. 6.

Figure 14:
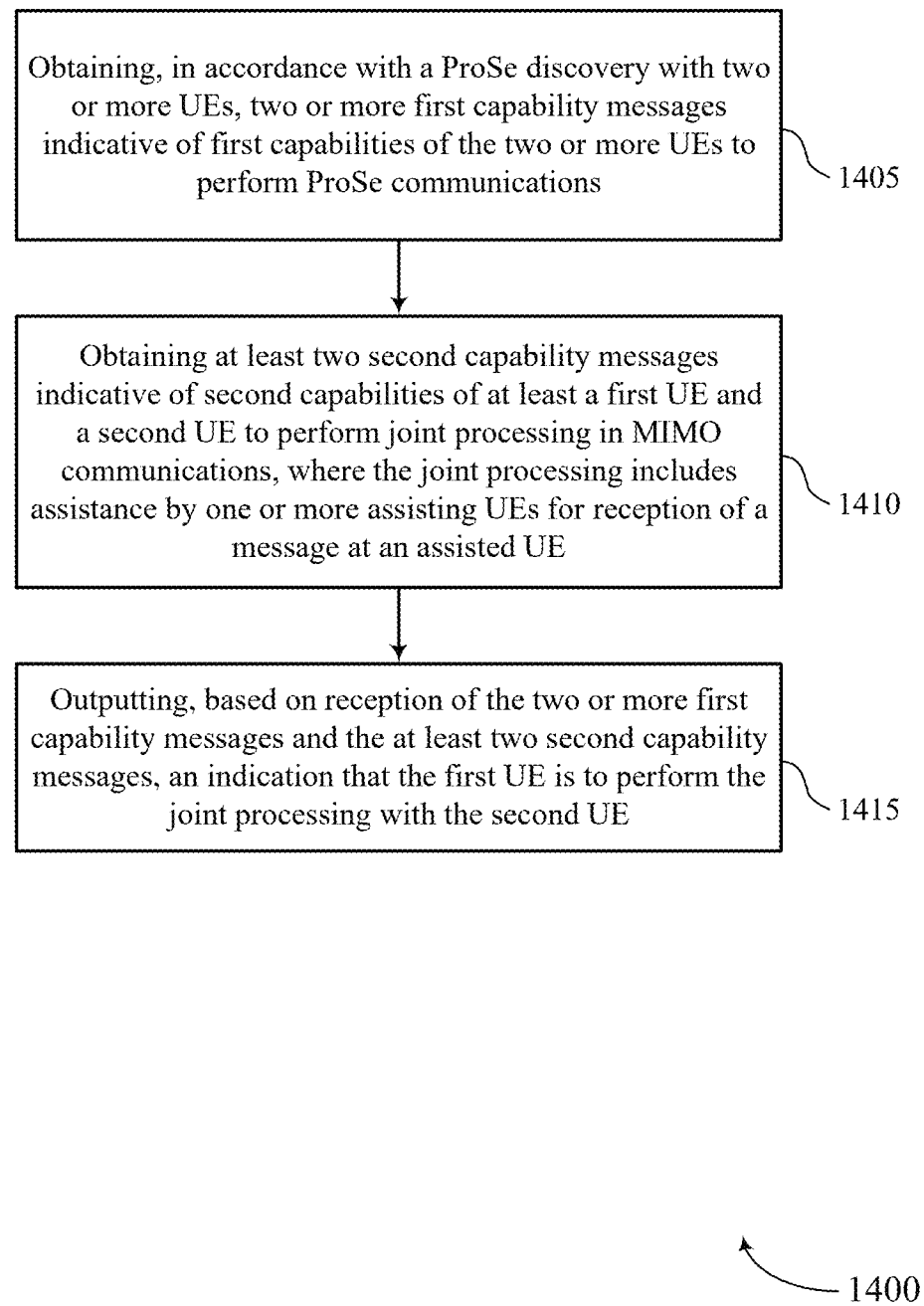

FIG. 14 shows a flowchart illustrating a method 1400 that supports techniques for joint demodulation via ProSe in accordance with various aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include obtaining, in accordance with a proximity-based service (ProSe) discovery with two or more user equipments (UEs), two or more first capability messages indicative of first capabilities of the two or more UEs to perform ProSe communications. The operations of 1405 may be performed in accordance with examples as disclosed herein. In some examples, aspects of the operations of 1405 may be performed by a ProSe capability message manager 1025 as described with reference to FIG. 10.

At 1410, the method may include obtaining at least two second capability messages indicative of second capabilities of at least a first UE and a second UE to perform joint processing in multiple-input multiple-output (MIMO) communications, where the joint processing includes assistance by one or more assisting UEs for reception of a message at an assisted UE. The operations of 1410 may be performed in accordance with examples as disclosed herein. In some examples, aspects of the operations of 1410 may be performed by a joint processing capability manager 1030 as described with reference to FIG. 10.

At 1415, the method may include outputting, based on reception of the two or more first capability messages and the at least two second capability messages, an indication that the first UE is to perform the joint processing with the second UE. The operations of 1415 may be performed in accordance with examples as disclosed herein. In some examples, aspects of the operations of 1415 may be performed by a joint processing indication manager 1035 as described with reference to FIG. 10.

Figure 15:
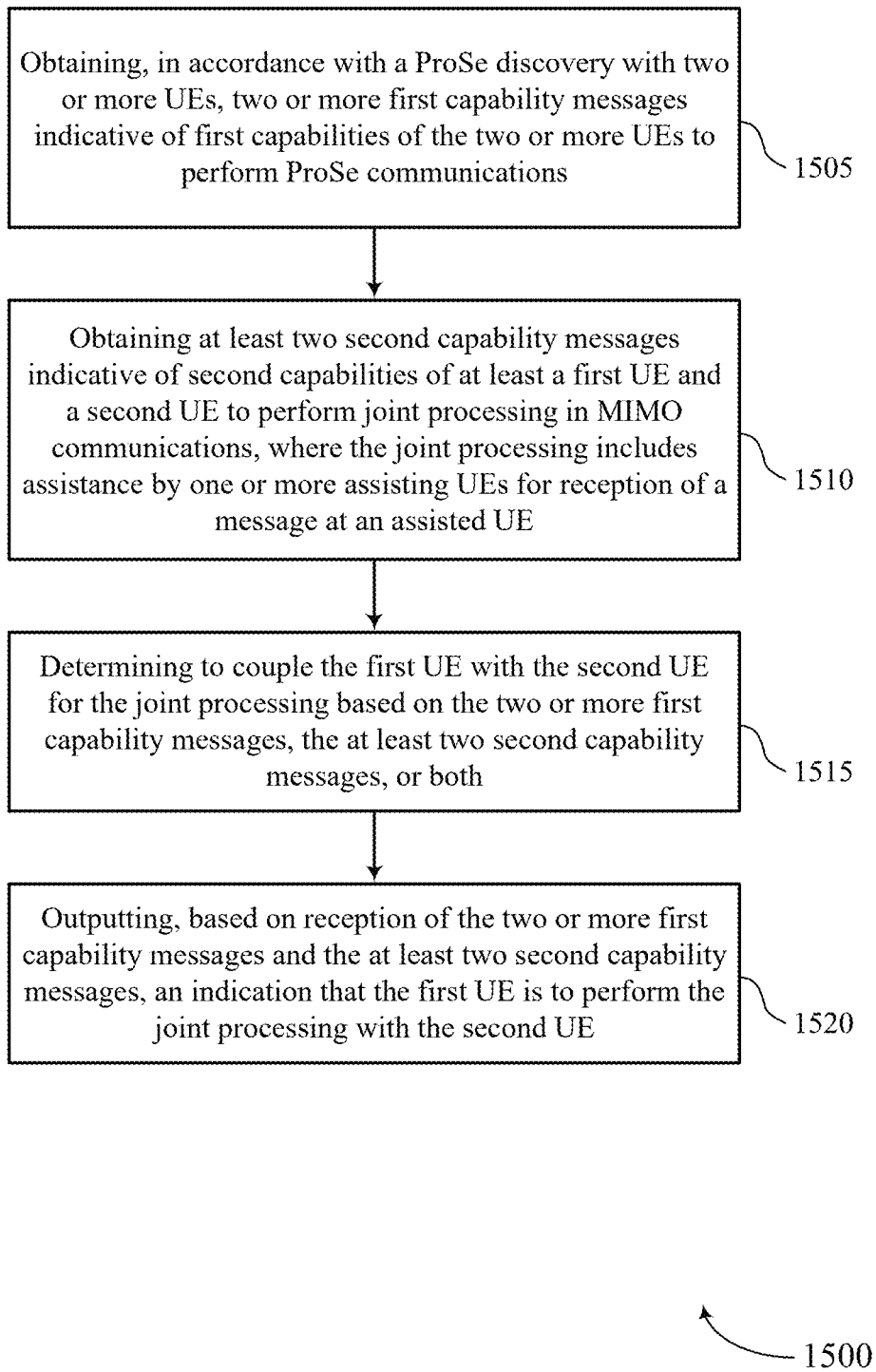

FIG. 15 shows a flowchart illustrating a method 1500 that supports techniques for joint demodulation via ProSe in accordance with various aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include obtaining, in accordance with a proximity-based service (ProSe) discovery with two or more user equipments (UEs), two or more first capability messages indicative of first capabilities of the two or more UEs to perform ProSe communications. The operations of 1505 may be performed in accordance with examples as disclosed herein. In some examples, aspects of the operations of 1505 may be performed by a ProSe capability message manager 1025 as described with reference to FIG. 10.

At 1510, the method may include obtaining at least two second capability messages indicative of second capabilities of at least a first UE and a second UE to perform joint processing in multiple-input multiple-output (MIMO) communications, where the joint processing includes assistance by one or more assisting UEs for reception of a message at an assisted UE. The operations of 1510 may be performed in accordance with examples as disclosed herein. In some examples, aspects of the operations of 1510 may be performed by a joint processing capability manager 1030 as described with reference to FIG. 10.

At 1515, the method may include determining to couple the first UE with the second UE for the joint processing based on the two or more first capability messages, the at least two second capability messages, or both. The operations of 1515 may be performed in accordance with examples as disclosed herein. In some examples, aspects of the operations of 1515 may be performed by a coupling manager 1040 as described with reference to FIG. 10.

At 1520, the method may include outputting, based on reception of the two or more first capability messages and the at least two second capability messages, an indication that the first UE is to perform the joint processing with the second UE. The operations of 1520 may be performed in accordance with examples as disclosed herein. In some examples, aspects of the operations of 1520 may be performed by a joint processing indication manager 1035 as described with reference to FIG. 10.

The following provides an overview of aspects of the present disclosure:

Aspect 1: A method for wireless communications at a first UE, comprising: transmitting, in accordance with ProSe discovery with a network entity, a first capability message indicative of a first capability of the first UE to perform ProSe communications; transmitting a second capability message indicative of a second capability of the first UE to perform joint processing for MIMO communications, wherein the joint processing includes assistance by one or more assisting UEs for reception of a message at an assisted UE; receiving, based at least in part on transmission of the first capability message and the second capability message, an indication that the first UE is to perform the joint processing with a second UE; and performing the joint processing with the second UE in accordance with the indication.

Aspect 2: The method of aspect 1, wherein the second capability of the first UE indicates that the first UE is capable to assist the second UE, during the joint processing, as a first assisting UE of the one or more assisting UEs, and the second capability message is also indicative of a decoding capability associated with the first UE being the first assisting UE to the second UE, the decoding capability indicates whether the first UE is capable of forwarding a processed signal or an unprocessed signal to the second UE.

Aspect 3: The method of aspect 2, wherein the second capability message is further indicative of a first processing delay associated with forwarding the processed signal, a second processing delay associated with forwarding the unprocessed signal, or both.

Aspect 4: The method of any of aspects 1 through 3, wherein the second capability of the first UE indicates that the first UE is capable of being assisted by the second UE, during the joint processing, as the assisted UE, and the second capability message is also indicative of a latency threshold associated with receiving the assistance from the second UE.

Aspect 5: The method of any of aspects 1 through 4, wherein receiving the indication that the first UE is to perform the joint processing with the second UE further comprises: receiving an indication of whether the first UE is to assist or be assisted by the second UE.

Aspect 6: The method of aspect 5, further comprising: receiving, based at least in part on receiving the indication that the first UE is to assist the second UE, an indication of a pilot sequence index associated with the second UE, wherein performing the joint processing comprises: processing, in accordance with the pilot sequence index, a downlink signal on behalf of the second UE; and forwarding the processed downlink signal to the second UE.

Aspect 7: The method of any of aspects 1 through 6, wherein the second capability of the first UE indicates that the first UE is capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof.

Aspect 8: The method of any of aspects 1 through 7, wherein receiving the indication that the first UE is to perform the joint processing with the second UE further comprises: receiving an indication of a pilot sequence index associated with the second UE, wherein performing the joint processing comprises: processing, in accordance with the pilot sequence index, a downlink signal; and forwarding the processed downlink signal to the second UE.

Aspect 9: The method of any of aspects 1 through 8, wherein receiving the indication that the first UE is to perform the joint processing with the second UE further comprises: receiving information indicative of a pilot sequence index associated with the second UE, and wherein performing the joint processing comprises: receiving a first processed downlink signal from the second UE; processing, in accordance with the pilot sequence index, a second downlink signal; and estimating an intra-cell interference based at least in part on receiving the first processed downlink signal and processing the second downlink signal.

Aspect 10: The method of any of aspects 1 through 9, further comprising: receiving, based at least in part on transmission of the first capability message, a request for information associated with the ProSe communications at the first UE, wherein the information comprises one or more UEs identified by the first UE via the ProSe discovery, one or more measurements of the one or more UEs identified by the first UE, a first delay associated with the ProSe discovery, a second delay associated with the ProSe communications, or any combination thereof; and transmitting a response comprising the requested information, wherein receiving the indication that the first UE is to perform the joint processing with the second UE is based at least in part on transmission of the response.

Aspect 11: The method of any of aspects 1 through 10, wherein the indication that the first UE is to perform the joint processing with the second UE further indicates a type of joint processing to be performed, a downlink slot during which the joint processing is to be performed, or both.

Aspect 12: A method for wireless communications at a network entity, comprising: obtaining, in accordance with a ProSe discovery with two or more UEs, two or more first capability messages indicative of first capabilities of the two or more UEs to perform ProSe communications; obtaining at least two second capability messages indicative of second capabilities of at least a first UE and a second UE to perform joint processing in MIMO communications, wherein the joint processing includes assistance by one or more assisting UEs for reception of a message at an assisted UE; and outputting, based at least in part on reception of the two or more first capability messages and the at least two second capability messages, an indication that the first UE is to perform the joint processing with the second UE.

Aspect 13: The method of aspect 12, further comprising: determining to couple the first UE with the second UE for the joint processing based at least in part on the two or more first capability messages, the at least two second capability messages, or both.

Aspect 14: The method of any of aspects 12 through 13, wherein at least one capability of the at least two second capabilities indicates that the first UE is capable to assist the second UE, during the joint processing, as a first assisting UE of the one or more assisting UEs, and at least one capability message is also indicative of a decoding capability associated with the first UE being the first assisting UE to the second UE, the decoding capability indicates whether the first UE is capable of forwarding a processed signal or an unprocessed signal.

Aspect 15: The method of aspect 14, wherein at least one capability message is further indicative of a first processing delay associated with forwarding the processed signal, a second processing delay associated with forwarding the unprocessed signal, or both.

Aspect 16: The method of any of aspects 12 through 15, wherein at least one capability of the at least two second capabilities indicates that the first UE is capable of being assisted by the second UE during the joint processing, as the assisted UE, and at least one capability message of the at least two second capability messages is also indicative of a latency threshold associated with receiving the assistance from the second UE.

Aspect 17: The method of any of aspects 12 through 16, wherein outputting the indication that the first UE is to perform the joint processing with the second UE further comprises: outputting an indication of whether the first UE is to assist or be assisted by the second UE.

Aspect 18: The method of any of aspects 12 through 17, wherein outputting the indication that the first UE is to perform the joint processing with the second UE further comprises: outputting an indication of a first pilot sequence index associated with the first UE, a second pilot sequence index associated with the second UE, or both.

Aspect 19: The method of any of aspects 12 through 18, wherein the second capabilities indicate that the first UE and the second UE are capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof.

Aspect 20: A first UE for wireless communications, comprising one or more memories storing processor-executable code, and one or more processors coupled with the one or more memories and individually or collectively operable to execute the code to cause the first UE to perform a method of any of aspects 1 through 11.

Aspect 21: A first UE for wireless communications, comprising at least one means for performing a method of any of aspects 1 through 11.

Aspect 22: A non-transitory computer-readable medium storing code for wireless communications, the code comprising instructions executable by one or more processors to perform a method of any of aspects 1 through 11.

Aspect 23: A network entity for wireless communications, comprising one or more memories storing processor-executable code, and one or more processors coupled with the one or more memories and individually or collectively operable to execute the code to cause the network entity to perform a method of any of aspects 12 through 19.

Aspect 24: A network entity for wireless communications, comprising at least one means for performing a method of any of aspects 12 through 19.

Aspect 25: A non-transitory computer-readable medium storing code for wireless communications, the code comprising instructions executable by one or more processors to perform a method of any of aspects 12 through 19.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:
one or more memories storing processor-executable code; and
one or more processors coupled with the one or more memories and individually or collectively operable to execute the code to cause the first UE to:
transmit, in accordance with proximity-based service (ProSe) discovery with a network entity, a first capability message indicative of a first capability of the first UE to perform ProSe communications;
transmit a second capability message indicative of a second capability of the first UE to perform joint processing for multiple-input multiple-output (MIMO) communications, wherein the joint processing includes assistance by one or more assisting UEs for reception of a message at an assisted UE;
receive, based at least in part on transmission of the first capability message and the second capability message, an indication that the first UE is to perform the joint processing with a second UE; and
perform the joint processing with the second UE in accordance with the indication.

2. The first UE of claim 1, wherein the second capability of the first UE indicates that the first UE is capable to assist the second UE, during the joint processing, as a first assisting UE of the one or more assisting UEs, and wherein the second capability message is also indicative of a decoding capability associated with the first UE being the first assisting UE to the second UE, wherein the decoding capability indicates whether the first UE is capable of forwarding a processed signal or an unprocessed signal to the second UE.

3. The first UE of claim 2, wherein the second capability message is further indicative of a first processing delay associated with forwarding the processed signal, a second processing delay associated with forwarding the unprocessed signal, or both.

4. The first UE of claim 1, wherein the second capability of the first UE indicates that the first UE is capable of being assisted by the second UE, during the joint processing, as the assisted UE, and wherein the second capability message is also indicative of a latency threshold associated with receiving the assistance from the second UE.

5. The first UE of claim 1, wherein, to receive the indication that the first UE is to perform the joint processing with the second UE, the one or more processors are individually or collectively further operable to execute the code to cause the first UE to:
receive an indication of whether the first UE is to assist or be assisted by the second UE.

6. The first UE of claim 5, wherein the one or more processors are individually or collectively further operable to execute the code to cause the first UE to:
receive, based at least in part on receiving the indication that the first UE is to assist the second UE, an indication of a pilot sequence index associated with the second UE, wherein, to perform the joint processing, the one or more processors are individually or collectively operable to execute the code to cause the first UE to:
process, in accordance with the pilot sequence index, a downlink signal on behalf of the second UE; and
forward the processed downlink signal to the second UE.

7. The first UE of claim 1, wherein the second capability of the first UE indicates that the first UE is capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof.

8. The first UE of claim 1, wherein, to receive the indication that the first UE is to perform the joint processing with the second UE, the one or more processors are individually or collectively further operable to execute the code to cause the first UE to:
receive an indication of a pilot sequence index associated with the second UE, wherein, to perform the joint processing, the one or more processors are individually or collectively operable to execute the code to cause the first UE to:
- process, in accordance with the pilot sequence index, a downlink signal; and
- forward the processed downlink signal to the second UE.

9. The first UE of claim 1, wherein, to receive the indication that the first UE is to perform the joint processing with the second UE, the one or more processors are individually or collectively further operable to execute the code to cause the first UE to:
- receive information indicative of a pilot sequence index associated with the second UE, and wherein, to perform the joint processing, the one or more processors are individually or collectively operable to execute the code to cause the first UE to:
  - receive a first processed downlink signal from the second UE;
  - process, in accordance with the pilot sequence index, a second downlink signal; and
  - estimate an intra-cell interference based at least in part on receiving the first processed downlink signal and processing the second downlink signal.

10. The first UE of claim 1, wherein the one or more processors are individually or collectively further operable to execute the code to cause the first UE to:
- receive, based at least in part on transmission of the first capability message, a request for information associated with the ProSe communications at the first UE, wherein the information comprises one or more UEs identified by the first UE via the ProSe discovery, one or more measurements of the one or more UEs identified by the first UE, a first delay associated with the ProSe discovery, a second delay associated with the ProSe communications, or any combination thereof; and
- transmit a response comprising the requested information, wherein receiving the indication that the first UE is to perform the joint processing with the second UE is based at least in part on transmission of the response.

11. The first UE of claim 1, wherein the indication that the first UE is to perform the joint processing with the second UE further indicates a type of joint processing to be performed, a downlink slot during which the joint processing is to be performed, or both.

12. A network entity, comprising:
- one or more memories storing processor-executable code; and
- one or more processors coupled with the one or more memories and individually or collectively operable to execute the code to cause the network entity to:
  - obtain, in accordance with a proximity-based service (ProSe) discovery with two or more user equipments (UEs), two or more first capability messages indicative of first capabilities of the two or more UEs to perform ProSe communications;
  - obtain at least two second capability messages indicative of second capabilities of at least a first UE and a second UE to perform joint processing in multiple-input multiple-output (MIMO) communications, wherein the joint processing includes assistance by one or more assisting UEs for reception of a message at an assisted UE; and
  - output, based at least in part on reception of the two or more first capability messages and the at least two second capability messages, an indication that the first UE is to perform the joint processing with the second UE.

13. The network entity of claim 12, wherein the one or more processors are individually or collectively further operable to execute the code to cause the network entity to:
- determine to couple the first UE with the second UE for the joint processing based at least in part on the two or more first capability messages, the at least two second capability messages, or both.

14. The network entity of claim 12, wherein at least one capability of the at least two second capabilities indicates that the first UE is capable to assist the second UE, during the joint processing, as a first assisting UE of the one or more assisting UEs, and wherein at least one capability message is also indicative of a decoding capability associated with the first UE being the first assisting UE to the second UE, wherein the decoding capability indicates whether the first UE is capable of forwarding a processed signal or an unprocessed signal.

15. The network entity of claim 14, wherein at least one capability message is further indicative of a first processing delay associated with forwarding the processed signal, a second processing delay associated with forwarding the unprocessed signal, or both.

16. The network entity of claim 12, wherein at least one capability of the at least two second capabilities indicates that the first UE is capable of being assisted by the second UE during the joint processing, as the assisted UE, and wherein at least one capability message of the at least two second capability messages is also indicative of a latency threshold associated with receiving the assistance from the second UE.

17. The network entity of claim 12, wherein, to output the indication that the first UE is to perform the joint processing with the second UE, the one or more processors are individually or collectively further operable to execute the code to cause the network entity to:
- output an indication of whether the first UE is to assist or be assisted by the second UE.

18. The network entity of claim 12, wherein, to output the indication that the first UE is to perform the joint processing with the second UE, the one or more processors are individually or collectively further operable to execute the code to cause the network entity to:
- output an indication of a first pilot sequence index associated with the first UE, a second pilot sequence index associated with the second UE, or both.

19. The network entity of claim 12, wherein the second capabilities indicate that the first UE and the second UE are capable, during the joint processing, of forwarding or receiving a hard decision or a soft decision, a first processing delay associated with forwarding processed signals, a second processing delay associated with forwarding unprocessed signals, a latency threshold associated with the ProSe communications, or any combination thereof.

20. A method for wireless communications at a first user equipment (UE), comprising:
- transmitting, in accordance with proximity-based service (ProSe) discovery with a network entity, a first capability message indicative of a first capability of the first UE to perform ProSe communications;
- transmitting a second capability message indicative of a second capability of the first UE to perform joint processing for multiple-input multiple-output (MIMO) communications, wherein the joint processing includes assistance by one or more assisting UEs for reception of a message at an assisted UE;

receiving, based at least in part on transmission of the first capability message and the second capability message, an indication that the first UE is to perform the joint processing with a second UE; and performing the joint processing with the second UE in accordance with the indication.

\* \* \* \* \*